(12) United States Patent
Ofuji et al.

(10) Patent No.: US 7,974,177 B2
(45) Date of Patent: Jul. 5, 2011

(54) USER EQUIPMENT, BASE STATION APPARATUS, AND METHOD

(75) Inventors: Yoshiaki Ofuji, Yokohama (JP); Anil Umesh, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 43 days.

(21) Appl. No.: 12/521,966

(22) PCT Filed: Dec. 26, 2007

(86) PCT No.: PCT/JP2007/074965
§ 371 (c)(1),
(2), (4) Date: Sep. 3, 2009

(87) PCT Pub. No.: WO2008/084695
PCT Pub. Date: Jul. 17, 2008

(65) Prior Publication Data
US 2010/0002655 A1 Jan. 7, 2010

(30) Foreign Application Priority Data
Jan. 9, 2007 (JP) ................................ 2007-001853

(51) Int. Cl.
*H04J 11/00* (2006.01)
(52) U.S. Cl. ........................................................ 370/203
(58) Field of Classification Search .......... 370/203–208, 370/310, 312, 328–330, 431, 432, 436, 437, 370/458; 455/422, 70
See application file for complete search history.

(56) References Cited

U.S. PATENT DOCUMENTS

| | | | | |
|---|---|---|---|---|
| 2007/0171864 A1* | 7/2007 | Zhang et al. | ................. | 370/329 |
| 2008/0075060 A1* | 3/2008 | Tiirola et al. | ................. | 370/344 |
| 2008/0075195 A1* | 3/2008 | Pajukoski et al. | ............. | 375/298 |
| 2008/0090528 A1* | 4/2008 | Malladi | ........................... | 455/70 |
| 2008/0102846 A1* | 5/2008 | Kim et al. | .................... | 455/450 |

FOREIGN PATENT DOCUMENTS

| JP | 2000-32565 A | 1/2000 |
|---|---|---|
| JP | 2006-525688 A | 11/2006 |

OTHER PUBLICATIONS

International Search Report w/translation from PCT/JP2007/074965 dated Feb. 5, 2008 (4 pages).
Written Opinion from PCT/JP2007/074965 dated Feb. 5, 2008 (3 pages).
3GPP TSG RAN WG1 Meeting #46bis; R1-062742; "CDM-Based Multiplexing Method of Multiple ACK/NACK and CQI for E-UTRA Uplink"; NTT DoCoMo, Ericsson, Fujitsu Mitsubishi Electric, Sharp, Toshiba Corporation; Seoul, Korea; Oct. 9-13, 2006 (6 pages).

(Continued)

*Primary Examiner* — Dmitry H Levitan
(74) *Attorney, Agent, or Firm* — Osha • Liang LLP

(57) ABSTRACT

User equipment that is capable of transmitting at least an uplink control channel to a base station apparatus using a single carrier method and to which persistent scheduling is applied, the user equipment includes a unit providing data arrival acknowledgement information, a unit providing channel quality information, a control channel generation unit generating an uplink control channel including at least one of the data arrival acknowledgement information or the channel quality information, and a transmission unit transmitting the uplink control channel using a predetermined dedicated bandwidth, in which the uplink control channel includes at least one unit block including a sequence in which a same factor reported using an upper-layer signaling is multiplied to each chip of an orthogonal code sequence for the user equipment.

24 Claims, 16 Drawing Sheets

OTHER PUBLICATIONS

3GPP TSG RAN WG1 Meeting #47; R1-063319; "Persistent Scheduling in E-UTRA"; NTT DoCoMo, Inc., NEC; Riga, Latvia; Nov. 6-10, 2006; (5 pages).

3GPP TSG RAN WG1 Meeting #47; R1-063354; "CDMA Based Multiplexing of ACK/NACK and CQI Control Information in E-UTRA Uplink"; KDDI, NTT DoCoMo; Nov. 6-10, 2006 (4 pages).

3GPP TSG RAn WG1 Ltd Ad Hoc; R1-061675; "Data-non-associated L1/L2 Control Channel Structure for E-UTRA Uplink"; Cannes, France; Jun. 27-30, 2006 (6 pages).

TSG-RAN WG1 LTE Ad Hoc; R1-060099; "Persistent Scheduling for E-UTRA"; Helsinki, Finland; Jan. 23-25, 2006 (2 pages).

Japanese Office Action for Application No. 2007-001853, mailed on Oct. 20, 2009 (5 pages).

* cited by examiner

FIG.14

USER EQUIPMENT, BASE STATION APPARATUS, AND METHOD

TECHNICAL FIELD

The present invention generally relates to a technical field of mobile communication systems, and more particularly to user equipment, a base station apparatus, and a method used in the mobile communication system.

BACKGROUND ART

In the technical field of the mobile communication systems, research and development for the next-generation communication systems have been rapidly accelerated. According to a communication system currently being considered, a single carrier system has been proposed to be used as uplink communication in the viewpoint of extending the coverage area while controlling the Peak-to-Average Power Ratio. Further, in the communication system using the single carrier method in the uplink communications, radio resources are appropriately allocated in both uplink and downlink in the form of a shared channel (SCH) in accordance with the communications status of the users. This process of determining of the allocation the radio resources is called scheduling. To appropriately perform the uplink scheduling, each user equipment transmits the pilot channel to the base station and the base station evaluates the uplink channel quality by checking the receiving quality of the pilot channel. Further, to perform a downlink scheduling, the base station transmits the pilot channel to the user equipment and the user equipment reports the CQI (Channel Quality Indicator) indicating the channel status based on the receiving quality of the pilot channel. Based on the received CQI from each equipment, the base station evaluates the downlink channel quality and performs the downlink scheduling.

As the data of an uplink control channel, there are control information items (hereinafter may be referred to as "essential control information items", "first control information", or "first control channel") that should be transmitted along with the data of an uplink data channel and other control information items (hereinafter may be referred to as "second control information" or "second control channel") that are transmitted regardless of the presence of the uplink data channel. The first control information may include information items necessary for demodulating the data channel such as the modulation method of the data channel and the channel coding rate. The second control information may include information items such as the downlink channel CQI, the downlink data arrival acknowledgement information (ACK/NACK), and a resource allocation request. Therefore, there are cases where the user equipment transmits only the first control information, only the second control information, or both first and second control information via the uplink control channel.

When a resource block (radio resource) is allocated for the uplink data transmission, the first control information (and, on an as needed basis, the second control information) are transmitted via the allocated resource blocks. However, in a case where the uplink data channel is not being transmitted, it is under consideration that the second control information is to be transmitted via a dedicated resource (dedicated frequency bandwidth). In the following, examples where a frequency bandwidth is used in such a way are briefly described.

FIG. 1 shows an example how uplink frequency bandwidths are being used. In the example of FIG. 1, there are provided two different data sizes of resource units (hereinafter may be simplified as resources) having a larger size and a smaller size, respectively. In FIG. 1, the larger resource unit has a frequency bandwidth ($F_{RB1}$) of 1.25 MHz and a duration time ($T_{RB}$) of 0.5 ms and the smaller resource unit has a frequency bandwidth ($F_{RB2}$) of 375 kHz and a duration time ($T_{RB}$) of 0.5 ms. The duration time corresponds to a period of a single radio packet data and may be referred to as a unit transmission period, a TTI (Transmission Time Interval), a sub-frame and the like. There are six (6) resources provided along the frequency axis and the size of the left end resource and the right end resource is smaller in the frequency domain than other four (4) resources. However, the pattern of the resource allocation may be determined in various ways and what is only required is that the determined pattern should be known to both the transmitting side and the receiving side in advance. In the example of FIG. 1, the uplink scheduling is performed so that the control channel (first control channel) to be transmitted along with the data channel and, on an as needed basis, the second control channel are to be transmitted using a part of the periods of larger resources (whose resource numbers are 2 through 5). Further, the transmission timings of the user equipment is adjusted so that the control channel (second control channel) is to be transmitted using the smaller resources (whose resource numbers are 1 and 6) while no uplink data channel is transmitted. Further, it is arranged so that the second control channel of certain user equipment is to be transmitted using two smaller resources. In the example of FIG. 1, the second control channel of user equipment "A" is to be transmitted using the $6^{th}$ resource in the $2^{nd}$ subframe and the $1^{st}$ resource in the $3^{rd}$ subframe. Similarly, the second control channel of user equipment "B" is to be transmitted using the $6^{th}$ resource in the $3^{rd}$ subframe and the $1^{st}$ resource in the $4^{th}$ subframe. As described above, the second control channels are transmitted by hopping in the time and frequency axis directions, therefore, it may become possible to obtain time and frequency diversity effects, thereby increasing the reliability of the appropriate demodulation of the second control channel in the base station.

FIG. 2 shows another example how uplink frequency bandwidths are being used. Similar to the case of FIG. 1, there are also provided two different data sizes of resources having a larger size and a smaller size, respectively. In this example, however, with respect to the smaller resources ($1^{st}$ and $6^{th}$ resources), the period $T_{RB}$ of the subframe is further divided into two sub-time periods. In the example of FIG. 2, the second control channel of certain user equipment "A" is to be transmitted using a first sub-time period of the $1^{st}$ subframe (a first half period of the subframe) of the $1^{st}$ resource and a second sub-time period of the same $1^{st}$ subframe (a second half period of the same subframe) of the $6^{th}$ resource. Similarly, the second control channel of user equipment "B" is to be transmitted using a first sub-time period of the $1^{st}$ subframe of the $6^{th}$ resource and a second sub-time period of the same $1^{st}$ subframe of the $1^{st}$ resource. The transmission of the second control channels of the user equipment "A" and "B" in the $1^{st}$ subframe is similarly repeated in $3^{rd}$ and $5^{th}$ subframes. As described above, the second control channels are transmitted by hopping in the time and frequency axis directions, therefore, it may become possible to obtain time and frequency diversity effects, thereby increasing the reliability of the appropriate demodulation of the second control channel in the base station. Further, in this example of FIG. 2, the transmission of the second control channels of both user equipment "A" and "B" is completed within the $1^{st}$ subframe. Therefore, this example of FIG. 2 is preferable in the viewpoint of reduction of transmission delay in the uplink control channel. This technique is described in, for example, Non Patent Document 1.

Non Patent Document 1: 3GPP, R1-061675
Non Patent Document 2: 3GPP, R1-060099
Non Patent Document 3: 3GPP, R1-063319

DISCLOSURE OF INVENTION

Problems to be Solved by the Invention

In FIGS. 1 and 2, a symbol such as "CONTROL A" and "CONTROL B" resides in a resource block. Such description may give an impression that only "CONTROL A" and "CONTROL B" can be transmitted in the resource block. However, from the viewpoint of effective use of the resources, it should be allowed also that a single resource may be shared by a plurality of user equipment (users). For example, there is a conceivable method in which a resource having a dedicated bandwidth can be shared by a plurality of user equipment by using the FDM (Frequency Division Multiplexing) method. However, if the users are multiplexed by using such an FDM method alone, the bandwidth occupied per user may become narrower and the number of chips in the bandwidth per user may also be reduced (the chip rate may be reduced). As a result, the number of orthogonal code sequences for the pilot channel used for discriminating user signals from one to another may be reduced, causing the increase of interference level that decreases the receiving quality of signals. Further, if it is allowed to frequently change the transmission bandwidth of the uplink control channel due to the change of the number of the multiplexed users, whenever the transmission bandwidth is changed, the base station is required to report the content of the change to the user equipment. This may lead to an increase in the amount of the downlink control data (signaling overhead) and reduce the transmission efficiency of the data channel. Further, there is another conceivable method in which a resource having a dedicated bandwidth can be shared by a plurality of user equipment (users). It is the CDM (Code Division Multiplexing) method performed in the W-CDMA mobile communication system. When the CDM method is used, it may become possible to secure wider bandwidth occupied by a single user. However, the interference power level may be increased and accordingly, the signal quality may be reduced. Further, when the same user transmits the multiplexed data of the data arrival acknowledge information (ACK/NACK) and the channel quality information (CQI) using the CDM method, the peak power may increase.

Further, when the traffic such as VOIP traffic in which data are periodically generated is processed, the amount of the downlink control data described above becomes non-negligible. To solve the problem, a so-called persistent scheduling has been proposed in which radio resources determined in advance are periodically allocated to a user (see, for example, Patent Documents 2 and 3).

An object of the present invention is to, when the uplink signal including at least one of the data arrival acknowledge information (ACK/NACK) or the channel quality information (CQI) with respect to the downlink data channel is transmitted from the user equipment to which the persistent scheduling is applied, multiplex the uplink control channel from the user equipment in which the persistent scheduling is applied while ensuring a higher number of orthogonal code sequences and reducing the frequency of changing the transmission bandwidth.

Means for Solving the Problems

According to an aspect of the present invention, user equipment is capable of transmitting at least an uplink control channel to a base station apparatus using a single carrier method and persistent scheduling in which a predetermined radio resource is periodically allocated in advance is applied to the user equipment. The user equipment includes a first providing unit configured to provide data arrival acknowledgement information indicating an acknowledge response or a negative acknowledge response as a response to a downlink data channel;

a second providing unit configured to provide channel quality information indicating downlink channel quality;

a control channel generation unit configured to generate an uplink control channel including at least one of the data arrival acknowledgement information or the channel quality information;

a transmission unit configured to, when a resource for transmitting an uplink data channel is not allocated, transmit the uplink control channel using a predetermined dedicated bandwidth. In the user equipment, the uplink control channel includes at least one unit block including a sequence in which a same factor reported using an upper-layer signaling is multiplied to each chip of an orthogonal code sequence for the user equipment.

According to an aspect of the present invention, a method used in user equipment is provided that is capable of transmitting at least an uplink control channel to a base station apparatus using a single carrier method and to which persistent scheduling in which a predetermined radio resource is periodically allocated in advance is applied. The method includes a generating step of generating an uplink control channel including at least one of the data arrival acknowledgement information or the channel quality information, the data arrival acknowledgement information indicating an acknowledge response or a negative acknowledge response as a response to a downlink data channel, the channel quality information indicating downlink channel quality; and a transmitting step of, when a resource for transmitting an uplink data channel is not allocated, transmitting the uplink control channel using a predetermined dedicated bandwidth. Further, in the method, the uplink control channel includes at least one unit block including a sequence in which a same factor reported using an upper-layer signaling is multiplied to each chip of an orthogonal code sequence for the user equipment.

According to an aspect of the present invention, a base station apparatus is capable of receiving at least an uplink control channel using a single carrier method from plural user equipment, and persistent scheduling in which a predetermined radio resource is periodically allocated in advance is applied to each of the plural user equipment. The base station includes an detection unit configured to detect at least one of the data arrival acknowledgement information or the channel quality information, the data arrival acknowledgement information indicating an acknowledge response or a negative acknowledge response as a response to a downlink data channel, the channel quality information indicating downlink channel quality;

a scheduling unit configured to perform scheduling for new packet data or retransmission packet data based on the channel quality information and the data arrival acknowledgement information;

a transmission unit configured to transmit the new packet data or the retransmission packet data via a downlink data channel;

a code information setting unit configured to set a code resource for transmitting the data arrival acknowledgement information and the channel quality information; and a report unit configured to report the code resource. Further, in the base station apparatus, the uplink control channel includes at least one unit block including a sequence in which a same factor included in the code resource is multiplied to each chip of an orthogonal code sequence for the user equipment, and the detection unit specifies at least one content of the data arrival acknowledgement information or the channel quality information by determining a factor multiplexed to each of the unit blocks.

According to an aspect of the present invention, a method used in a base station apparatus is capable of receiving at least an uplink control channel using a single carrier method from plural user equipment. The persistent scheduling in which a predetermined radio resource is periodically allocated in advance is applied to each of the plural user equipment. The method includes:

an detection step of detecting at least one of the data arrival acknowledgement information or the channel quality information, the data arrival acknowledgement information indicating an acknowledge response or a negative acknowledge response as a response to a downlink data channel, the channel quality information indicating downlink channel quality;

a scheduling step of performing scheduling for new packet data or retransmission packet data based on the channel quality information and the data arrival acknowledgement information;

a transmission step of transmitting the new packet data or the retransmission packet data via a downlink data channel;

a code information setting step of setting a code resource for transmitting the data arrival acknowledgement information and the channel quality information; and a report step of reporting the code resource. Further, in the method, the uplink control channel includes at least one unit block including a sequence in which a same factor included in the code resource is multiplied to each chip of an orthogonal code sequence for the user equipment, and in the detection step, at least one content of the data arrival acknowledgement information or the channel quality information is specified by determining a factor multiplexed to each of the unit blocks.

By configuring in this way, by processing each of the unit block sequences of the uplink control channel one by one, the uplink control channel being from the user equipment to which the persistent scheduling is applied, the base station apparatus may appropriately separate plural users one from another while maintaining the orthogonality between the users. The information amount of the data arrival acknowledgement information or the channel quality information is relatively small. Therefore, the process that one or more factors to be multiplied to the CAZAC (Constant Amplitude Zero Auto-Correlation) code is enough to indicate the data arrival acknowledgement information or the channel quality information.

According to an aspect of the present invention, user equipment is capable of transmitting at least an uplink control channel to a base station apparatus using a single carrier method and to which persistent scheduling in which a predetermined radio resource is periodically allocated in advance is applied. The user equipment includes:

a first providing unit configured to provide data arrival acknowledgement information indicating an acknowledge response or a negative acknowledge response as a response to a downlink data channel;

a second providing unit configured to provide channel quality information indicating downlink channel quality;

a control channel generation unit configured to generate an uplink control channel including at least one of the data arrival acknowledgement information or the channel quality information;

a transmission unit configured to, when a resource for transmitting an uplink data channel is not allocated, transmit the uplink control channel using a predetermined dedicated bandwidth. Further, in the uplink control channel including the data arrival acknowledgement information, a group of factors to be multiplied to each of plural unit blocks including a sequence in which a same factor reported using an upper-layer signaling is multiplied to each chip of an orthogonal code sequence for the user equipment indicate an orthogonal code sequence, and the uplink control channel including the channel quality information includes at least one of plural unit blocks including a sequence in which a factor different from the factor reported using the upper-layer signaling is multiplied to each chip of an orthogonal code sequence for the user equipment.

According to an aspect of the present invention, a method is provided that is used in user equipment capable of transmitting at least an uplink control channel to a base station apparatus using a single carrier method and the persistent scheduling in which a predetermined radio resource is periodically allocated in advance is applied to the user equipment. The method includes:

a generating step of generating an uplink control channel including at least one of the data arrival acknowledgement information or the channel quality information, the data arrival acknowledgement information indicating an acknowledge response or a negative acknowledge response as a response to a downlink data channel, the channel quality information indicating downlink channel quality; and a transmitting step of, when a resource for transmitting an uplink data channel is not allocated, transmitting the uplink control channel using a predetermined dedicated bandwidth. Further, in the uplink control channel including the data arrival acknowledgement information, a group of factors to be multiplied to each of plural unit blocks including a sequence in which a same factor reported using an upper-layer signaling is multiplied to each chip of an orthogonal code sequence for the user equipment indicate an orthogonal code sequence, and the uplink control channel including the channel quality information includes at least one of plural unit blocks including a sequence in which a factor different from the factor reported using the upper-layer signaling is multiplied to each chip of an orthogonal code sequence for the user equipment.

According to an aspect of the present invention, a base station apparatus is capable of receiving at least an uplink control channel using a single carrier method from plural user equipment, the persistent scheduling in which a predetermined radio resource is periodically allocated in advance is applied to each of the plural user equipment. The base station includes:

an detection unit configured to detect at least one of the data arrival acknowledgement information or the channel quality information, the data arrival acknowledgement information indicating an acknowledge response or a negative acknowledge response as a response to a downlink data channel, the channel quality information indicating downlink channel quality;

a scheduling unit configured to perform scheduling for new packet data or retransmission packet data based on the channel quality information and the data arrival acknowledgement information;

a transmission unit configured to transmit the new packet data or the retransmission packet data via a downlink data channel;

a code information setting unit configured to set a code resource for transmitting the data arrival acknowledgement information and the channel quality information; and a report unit configured to report the code resource. Further, in the base station apparatus, the code information setting unit sets two types of a code resources, one of which being for transmitting the data arrival acknowledgement information, and the other of which being for transmitting the channel quality information, in the uplink control channel including the data arrival acknowledgement information, a group of factors to be multiplied to each of plural unit blocks including a sequence in which a same factor reported using an upper-layer signaling is multiplied to each chip of an orthogonal code sequence for the user equipment indicate an orthogonal code sequence, the uplink control channel including the channel quality information includes at least one of plural unit blocks including a sequence in which a factor different from the factor reported using the upper-layer signaling is multiplied to each chip of an orthogonal code sequence for the user equipment, and the detection unit specifies at least one content of the data arrival acknowledgement information or the channel quality information by determining the different factor multiplexed to each of the unit blocks.

According to an aspect of the present invention, a method is provided that is used in user equipment capable of transmitting at least an uplink control channel to a base station apparatus using a single carrier method and the persistent scheduling in which a predetermined radio resource is periodically allocated in advance is applied to the user equipment. the method includes:

an detection step of detecting at least one of the data arrival acknowledgement information or the channel quality information, the data arrival acknowledgement information indicating an acknowledge response or a negative acknowledge response as a response to a downlink data channel, the channel quality information indicating downlink channel quality;

a scheduling step of performing scheduling for new packet data or retransmission packet data based on the channel quality information and the data arrival acknowledgement information;

a transmission step of transmitting the new packet data or the retransmission packet data via a downlink data channel;

a code information setting step of setting a code resource for transmitting the data arrival acknowledgement information and the channel quality information; and a report step of reporting the code resource. Further, in the code information setting step, two types of a code resources are provided, one of which being for transmitting the data arrival acknowledgement information, and the other of which being for transmitting the channel quality information, in the uplink control channel including the data arrival acknowledgement information, a group of factors to be multiplied to each of plural unit blocks including a sequence in which a same factor reported using an upper-layer signaling is multiplied to each chip of an orthogonal code sequence for the user equipment indicate an orthogonal code sequence, the uplink control channel including the channel quality information includes at least one of plural unit blocks including a sequence in which a factor different from the factor reported using the upper-layer signaling is multiplied to each chip of an orthogonal code sequence for the user equipment, and in the detection step, at least one content of the data arrival acknowledgement information or the channel quality information is specified by determining the different factor multiplexed to each of the unit blocks.

As described above, by providing a block spreading code (different factor), it may become possible to further increase the total number of code multiplexing users. As a result, it may become possible to improve the effect of reducing the frequency of changing the transmission bandwidths resulting from the increase/decrease of the number of multiplexing users.

Advantageous Effect of the Invention

According to an embodiment of the present invention, when the uplink signal including at least one of the data arrival acknowledge information (ACK/NACK) or the channel quality information (CQI) with respect to the downlink data channel is transmitted from the user equipment to which the persistent scheduling is applied, it may become possible to multiplex the uplink control channel from the user equipment employing the persistent scheduling while ensuring a higher number of orthogonal code sequences and reducing the frequency of changing the transmission bandwidths.

BRIEF DESCRIPTION OF THE DRAWINGS

FIG. 14 is a drawing showing other specific examples of first through twelfth factors and block spreading codes to be multiplied to long blocks (LBs);

EXPLANATION OF REFERENCES

Figure 1:
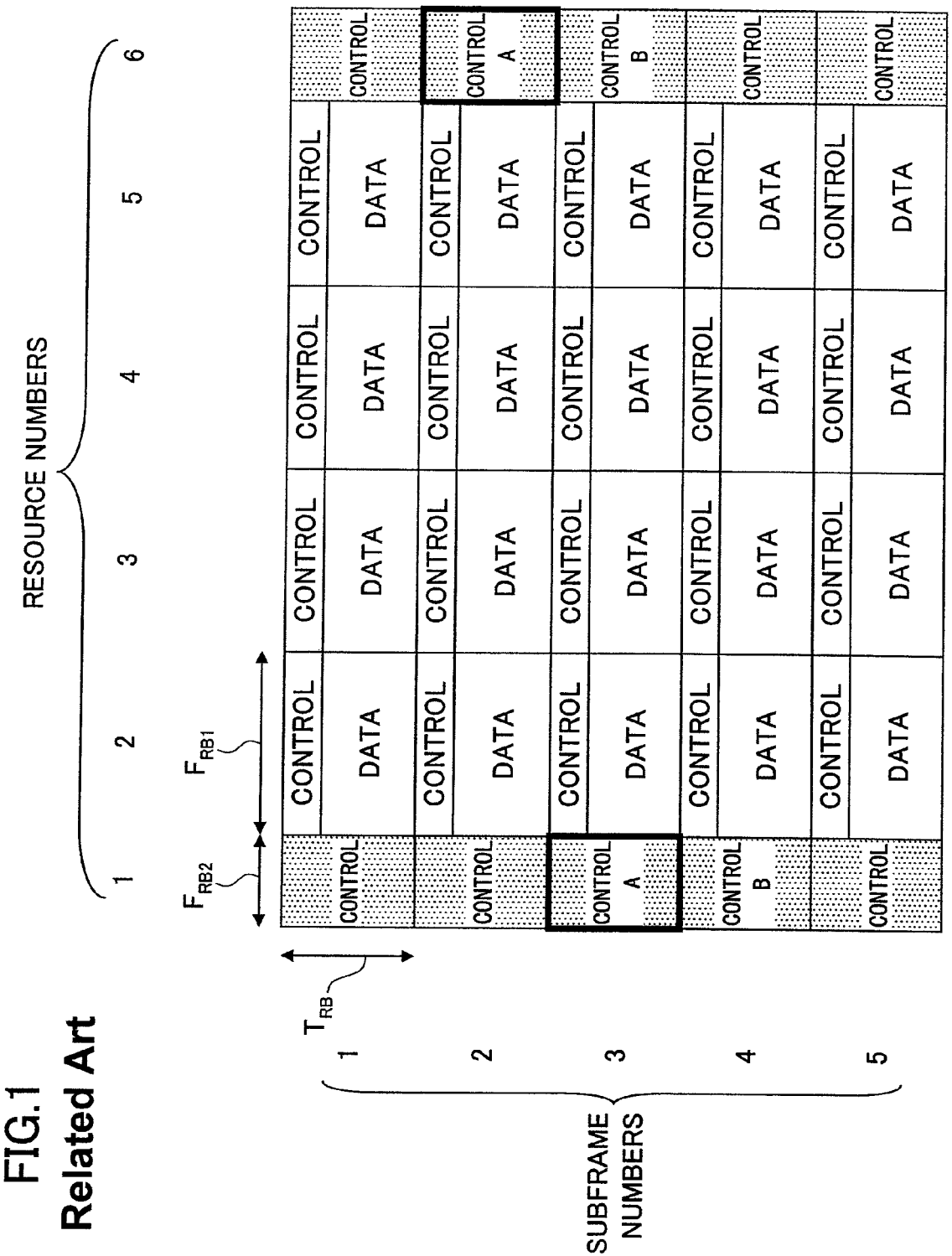
FIG. 1 is a drawing showing an example of the usage of bandwidth used in a mobile communication system.
Figure 2:
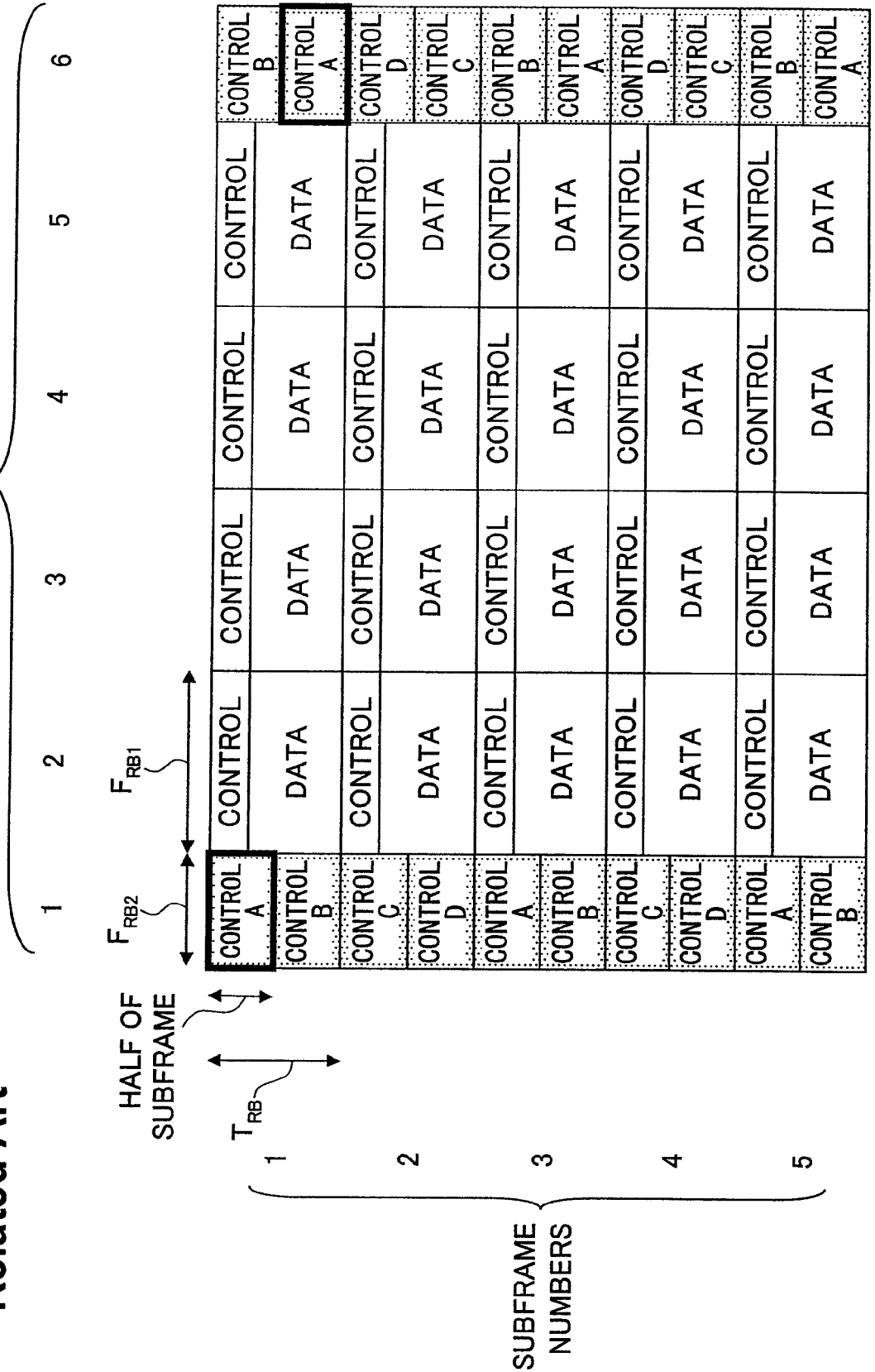
FIG. 2 is a drawing showing another example of the usage of bandwidths used in a mobile communication system.

302: CQI ESTIMATION SECTION
304: ACK/NACK DETERMINATION SECTION
306: BLOCK-BASED MODULATION PATTERN GENERATION SECTION
308: BLOCK-BASED MODULATION SECTION
310: DFT (DISCRETE FOURIER TRANSFORM) SECTION
312: SUBCARRIER MAPPING SECTION
314: IFFT (INVERSE FAST FOURIER TRANSFORM) SECTION
316: CP (CYCLIC PREFIX) ADDITION SECTION
318: MULTIPLEX SECTION
320: RF TRANSMISSION SECTION
322: POWER AMPLIFIER
324: DUPLEXER
330: CODE INFORMATION SPECIFYING SECTION
332: CAZAC CODE GENERATION SECTION
334: CYCLIC SHIFT SECTION
335: BLOCK SPREADING SECTION
336: FREQUENCY SETTING SECTION
338: PILOT SIGNAL GENERATION SECTION
702: DUPLEXER
704: RF RECEIVE CIRCUIT
706: RECEIVE TIMING ESTIMATION SECTION
708: FFT SECTION
710: CHANNEL ESTIMATION SECTION
712: SUBCARRIER DEMAPPING SECTION
714: FREQUENCY REGION EQUALIZATION SECTION
716: IDFT (INVERSE DFT) SECTION
718: DEMODULATION SECTION
720: RETRANSMISSION CONTROL SECTION
722: SCHEDULER
724: CODE INFORMATION SETTING SECTION

BEST MODE FOR CARRYING OUT THE INVENTION

According to an embodiment of the present invention, when no resources are allocated to transmit an uplink data channel, an uplink control channel including at least one of data arrival acknowledgement information (ACK/NACK) or channel quality information (CQI) is transmitted by using a predetermined dedicated frequency bandwidth. Further, the upper control channel includes plural unit block sequences (long blocks) in which the same factor is multiplied to each chip of an orthogonal code sequence (typically CAZAC code sequence) for user equipment employing persistent scheduling. Therefore, it may become possible for the base station apparatus to adequately separate signals from plural user equipment because the orthogonality among signals from the plural user equipment can be maintained when the uplink control channel from the user equipment employing persistent scheduling is processed with respect to each of the unit block sequences (long blocks). The information amount of the data arrival acknowledgement information (ACK/NACK) and the channel quality information (CQI) are relatively small. Therefore, it becomes possible to indicate those data arrival acknowledgement information (ACK/NACK) and the channel quality information (CQI) by using just one or more factors to be multiplied to the CAZAC code.

According to an embodiment of the present invention, the uplink control channel not being attached to the uplink data channel includes the CAZAC code sequences and a pilot channel, the CAZAC code sequence being repeated at the same times as the number of long blocks (LBs) along with any multiplying factors, the pilot channel including the CAZAC code sequences. As a result, as long as the base station apparatus processes the uplink control channel with respect to each long block and each short block, the characteristics of the CAZAC code sequence can be maintained. This means that not only an excellent orthogonality among the user equipment can be provided but also the CAZAC codes for the long blocks (LBs) may be used as a reference signal for the purpose of the channel estimation, the path search and the like. Therefore, it may become possible to perform the channel estimation and the like by using not only a small number of short blocks (SBs) which are included in the pilot channel but also a large number of the long blocks (LBs) included in the uplink control channel, thereby allowing for great contribution to the enhancement of the accuracies of the channel estimation and the path search.

According to an embodiment of the present invention, the code division multiplexing (CDM) method and/or the frequency division multiplexing (FDM) method using the CAZAC codes may be used as a method of multiplexing the uplink control channels from plural user equipment. However, the CDM method is preferentially used. By doing this, it may become possible to reduce the necessity of changing the transmission bandwidths of the user equipment as much as possible. When the FDM method is used in this case, it is not always necessary to divide the bandwidth into as narrow as 1/(the number of user equipment). Therefore, it may become possible to ensure a wider transmission bandwidth of the uplink control channels to some extent, and ensure a larger number of code sequences for discriminating the user equipment one from another. Further, types of the bandwidths provided in the FDM are limited. Therefore, it may become possible to control (reduce) the frequency of changing the transmission bandwidths. Another reason why the frequency of changing the transmission bandwidths is controlled as much as possible is that the signal quality may not be greatly improved even when the transmission bandwidths is changed frequently because the data size of the data arrival acknowledgement information (ACK/NACK) and the channel quality information (CQI) are relatively small. Rather, it would be better not to allow the frequent change of the transmission bandwidths to reduce the overhead and it would be better to perform transmission power control to ensure the signal quality.

According to an embodiment of the present invention, a group of factors (block spreading code) to be multiplied to each of the plural unit block sequences having the same content is provided so as to constitute orthogonal code sequences. In this case, the unit block sequences may include a sequence generated by multiplying each chip of the orthogonal code sequence by the same factor (provided as the factor different from the block spreading code). By providing the block spreading code, it may become possible to further increase the number of code division multiplexing. By doing this, it may become possible to further increase the effectiveness of controlling (reducing) the frequency of changing the transmission bandwidths resulting from the increase/decrease of the number of user equipment.

Embodiment 1

Figure 3:
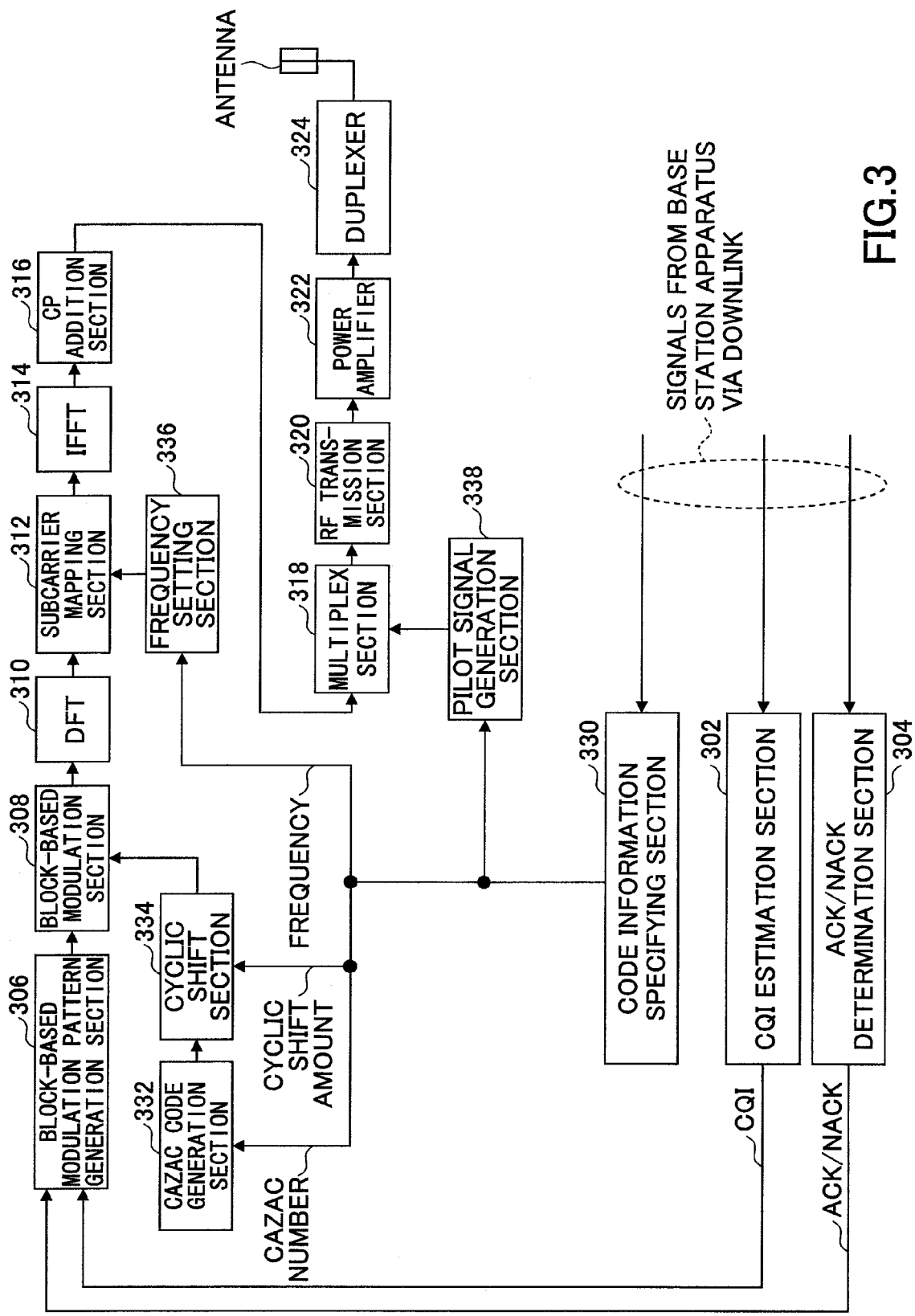
FIG. 3 is a block diagram showing user equipment according to an embodiment of the present invention.

FIG. 3 is a block diagram showing user equipment according to an embodiment of the present invention. As shown in FIG. 3, the user equipment includes a CQI estimation section 302, an ACK/NACK determination section 304, a block-based modulation pattern generation section 306, a block-based modulation section 308, a DFT (Discrete Fourier Transform) section 310, a subcarrier mapping section 312, an IFFT (Inverse Fast Fourier Transform) section 314, a CP (Cyclic Prefix) addition section 316, a multiplex section 318, an RF transmission section 320, a power amplifier 322, a duplexer 324, a code information specifying section 330, a CAZAC code generation section 332, a cyclic shift section 334, a frequency setting section 336, and a pilot signal generation section 338.

The CQI estimation section 302 measures and outputs an amount indicating a downlink channel status, namely a CQI (Channel Quality Indicator). The downlink channel status data may be detected by, for example, measuring the receiving quality (may be referred to as SIR, SINR and the like) of the pilot channel transmitted from the base station and converting the measured value into a predetermined value. For example, a measured receiving quality (SIR) may be converted into a value indicating one of 32 levels and the converted value may be expressed using five-bit data as the CQI data.

The ACK/NACK determination section 304 determines whether there is an error in each packet data constituting the received downlink data channel and outputs the determination results as data arrival acknowledgement information. The data arrival acknowledgement information may be expressed by an acknowledge response (ACK) indicating no error is detected or a negative acknowledge response (NACK) indicating that an error is detected. The data arrival acknowledgement information is required to be used for just indicating whether there is an error in the received packet data. Therefore, theoretically, one bit would be enough to indicate the data arrival acknowledgement information. However, more than one bit may also be used to indicate the data arrival acknowledgement information.

The block-based modulation pattern generation section 306 adjusts the channel quality information (CQI) and the data arrival acknowledgement information (ACK/NACK) so as to fit the modulation pattern of each block. A predetermined number of blocks are included in a subframe, and the subframe constitutes a TTI (Transmission Time Interval) which is a unit of resource allocation.

Figure 4:
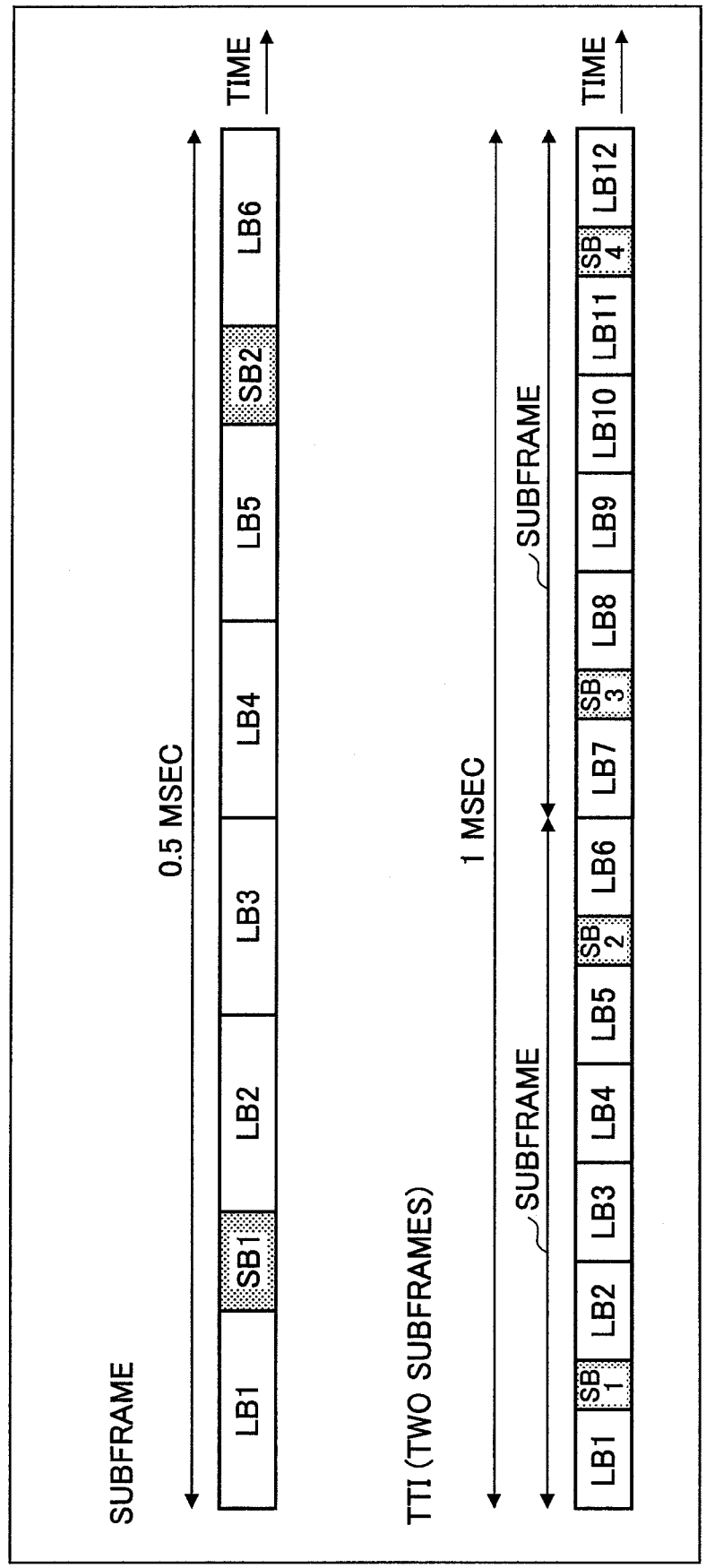
FIG. 4 is a drawing showing exemplary configurations of a subframe having blocks and a TTI having subframes.

FIG. 4 shows an example of the subframe and the TTI. In the example of FIG. 4, the TTI having a length of 1.0 ms includes two subframes each having a length of 0.5 ms. Each subframe has six long blocks (LBs) and two short blocks (SBs). The long block has a length of, for example, 66.7 μs and the short block has a length of, for example, 33.3 μs. However, these values are examples only and may be adequately changed on an as needed basis. Generally, the long blocks (LBs) are used for transmitting data unknown to the receiving side (such as the control channel and the data channel), and the short blocks (SBs) are used for transmitting data known to the receiving side (such as the pilot channel). In the example of FIG. 4, one TTI includes twelve (12) long blocks (LB1 through LB12) and four (4) short blocks (SB1 through SB4).

The block-based modulation pattern generation section 306 in FIG. 3 determines a corresponding relationship between one or more long blocks among the twelve long blocks (LB1 through LB12) and a bit indicating the channel quality information (CQI) and a corresponding relationship between one or more long blocks among the twelve long blocks (LB1 through LB12) and a bit indicating the data arrival acknowledgement information (ACK/NACK). The user equipment may transmit only the channel quality information (CQI), only the data arrival acknowledgement information (ACK/NACK), or both of the channel quality information (CQI) and the data arrival acknowledgement information (ACK/NACK) using the uplink control channel. Therefore, there may be cases where (A) each of the twelve (12) long blocks (LBs) is associated with the channel quality information (CQI), (B) each of the twelve (12) long blocks (LBs) is associated with the data arrival acknowledgement information (ACK/NACK), or (C) some of the twelve (12) long blocks (LBs) are associated with the channel quality information (CQI) and the rest of the (12) long blocks (LBs) are associated with the data arrival acknowledgement information (ACK/NACK). In any case, based on such a corresponding relationship, one factor is provided with respect to each of the twelve (12) long blocks (LBs), and accordingly, in total twelve (12) factors (first through twelfth factors) are provided per one TTI.

Figure 5:
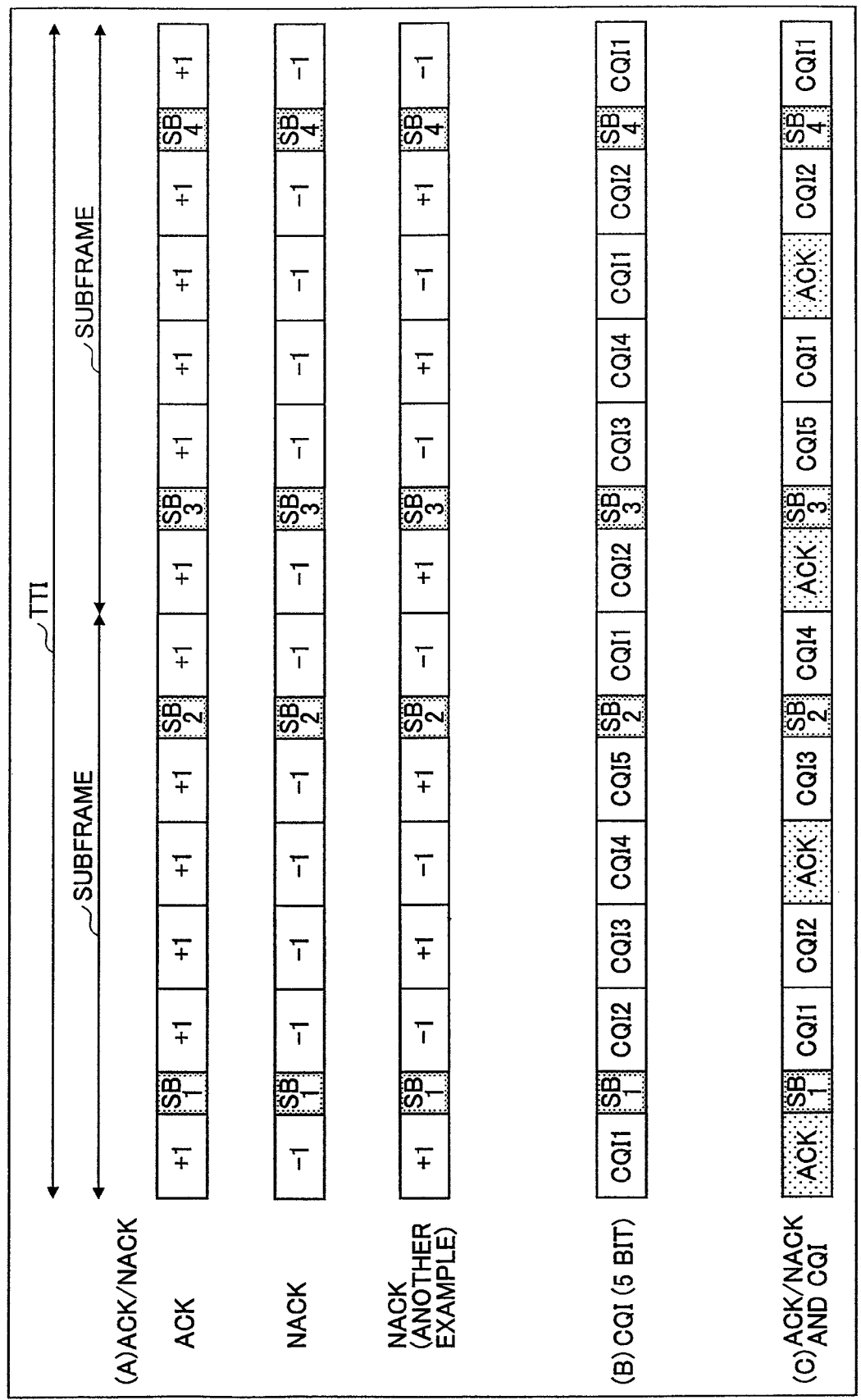
FIG. 5 is a drawing showing specific examples of factors to be multiplied to long blocks (LBs)

FIG. 5 shows a specific example of the factors each associated with the corresponding long blocks (LBs). In the example (A) of FIG. 5, a case is shown where only the data arrival acknowledgement information (ACK/NACK) is to be transmitted. As an example, when the acknowledge response (ACK) is to be transmitted, all of the twelve (12) factors are given as "1". On the other hand, when the negative acknowledge response (NACK) is to be transmitted, all of the twelve (12) factors are given as "−1". In this case, when different factors "1" and "−1" are used, the signals can be transmitted in different phases. However, it may be determined that one of the acknowledge response (ACK) and the negative acknowledge response (NACK) is not to be transmitted. The bottom of the example (A) of FIG. 5 shows another example of the data arrival acknowledgement information (ACK/NACK), in which factors "1" and "−1" are mixed together. However, the specific values of the factors in the above cases are examples only, and any other factors may be used and mixed together as long as the twelve (12) factors used for the acknowledge response (ACK) is, as a whole, different from the twelve (12) factors used for the negative acknowledge response (NACK) so as to distinguish one from another. Further, the data arrival acknowledgement information (ACK/NACK) can be indicated by using not only twelve (12) factors but also one or more factors. Namely, for example, the acknowledge response (ACK) and the negative acknowledge response (NACK) may be distinguished one from another by using a single factor, two factors such as (+1, +1) and (+1, −1), or more than two factors. When a single factor is used to distinguish the acknowledge response (ACK) from the negative acknowledge response (NACK), it becomes the most simplest method. However, from the viewpoint of improving the accuracy of the determination (discrimination), it may be preferable to use two or more factors which enable to use the phase differences to distinguish the acknowledge response (ACK) from the negative acknowledge response (NACK). Further, the factor is not limited to ±1. Generally, the factor may be any complex number. However, when the factor is ±1, it may be advantageous because the calculation may become easier simply by inverting the code. This is also because, as described below, the same factor is multiplied to each chip of a CAZAC code sequence.

If the base station incorrectly recognizes the acknowledge response (ACK) as the negative acknowledge response (NACK), packet data that are not actually required to be retransmitted are just retransmitted. However, if the base station incorrectly recognizes the negative acknowledge response (NACK) as the acknowledge response (ACK), the user equipment can no longer receive the necessary packet data for packet composition, causing a packet loss and improper packet composition using new packet data, which may remarkably degrade the receiving quality. Therefore, it is preferable that the patterns of the negative acknowledge response (NACK) and the acknowledge response (ACK) using one or more factors is to be determined so as to avoid the case where the negative acknowledge response (NACK) is incorrectly recognized as the acknowledge response (ACK).

In the example (B) of FIG. 5, a case is shown where only the channel quality information (CQI) is to be transmitted. More specifically, in the example (B) of FIG. 5, the channel quality information (CQI) is indicated by using five (5) bits, which are expressed by CQI1, CQI2, CQI3, CQI4, and CQI5 in the order from the highest order bit to the lowest order bit. In this case, one long block (LB) is associated with any one bit of the five (5) bits. In other words, the factors provided with respect to each of the twelve (12) long blocks (LBs) are any of CQI1 through CQI5. As shown in the example (B) of FIG. 5, generally, the higher the order bit is, the more the order bit is included in one TTI. More specifically, the highest order bit CQI1 is allocated in four (4) long blocks (LBs); the CQI2 is allocated in three (3) long blocks (LBs); each of the CQIs 3 and 4 is allocated in two (2) long blocks (LBs); and the CQI5 is allocated in one (1) long block. By allocating in this way, it may become possible to more effectively avoid a case where the CQI value significantly changes even when an error occurs.

In the example (C) of FIG. 5, a case is shown where both the data arrival acknowledgement information (ACK/NACK) and the channel quality information (CQI) are to be transmitted using the same TTI from the same user equipment. As shown in the example (C) of FIG. 5, four (4) long blocks (LBs) are associated with the data arrival acknowledgement information (ACK/NACK) and the rest of the long blocks (LBs), i.e., eight (8) long blocks (LBs), are associated with the channel quality information (CQI). In a case where the same user equipment transmits both the data arrival acknowledgement information (ACK/NACK) and the channel quality information (CQI), if plural TTIs can be used, the method described in examples (A) or (B) of FIG. 5 may be used. Further, in a case where the channel quality is reduced due to, for example, the movement of the user equipment from the center portion to the boundary portion of the cell, the report of the channel quality information (CQI) may be stopped so that only the data arrival acknowledgement information (ACK/NACK) is reported. Which information is to be transmitted via the uplink control channel may be appropriately changed by an upper-layer signaling or the like.

As described above, the block-based modulation pattern generation section 306 in FIG. 3 provides one factor with respect to each of the twelve (12) large blocks so that in total twelve (12) factors (first through twelfth factors) are provided with respect to each TTI.

The block-based modulation section 308 in FIG. 3 extracts (generates) an information sequence to be transmitted in one TTI by constituting a first long block (LB) by multiplying the first factor to each chip of the CAZAC code sequence, the CAZAC code sequence being allocated to the user equipment and having a length associated with the length of one long block (LB), constituting a second long block (LB) by multiplying the second factor to each chip of the same CAZAC code sequence, by repeating the procedure to constitute third through twelfth long blocks (LBs) and arranging the generated first through twelfth long blocks (LBs) in this order to form one TTI. The CAZAC code sequence commonly used for each long block (LB) is an orthogonal code sequence allocated by the serving cell to distinguish the user equipment from one another and the characteristics of The CAZAC code sequence are described below.

The DFT (Discrete Fourier Transform) section 310 performs a DFT to convert time-domain data into frequency-domain data.

The subcarrier mapping section 312 performs a mapping in the frequency domain. Particularly when the FDM (Frequency Domain Multiplexing) method is employed for multiplexing signals from plural user equipment, the subcarrier mapping section 312 performs the mapping on the signals in accordance with the bandwidth set by the frequency setting section 336. The FDM system method includes a localized FDM method and a distributed FDM method. In the localized FDM method, a consecutive bandwidth along the frequency axis is allocated to each user equipment. On the other hand, in the distributed FDM method, a downlink signal is generated so that each user equipment has plural intermittent (distributed) frequency components across a wide frequency range (i.e., across the entire bandwidth $F_{RB2}$ dedicated to the uplink control channel).

The IFFT section 314 performs an IFFT to return from a frequency-domain signal back to a time-domain signal.

The CP addition section 316 adds CP (Cyclic Prefix) to the data to be transmitted. The cyclic prefix (CP) serves as a guard interval to absorb a propagation delay and received timing differences of plural user equipment at the base station.

The multiplex section 318 multiplexes the data to be transmitted with the pilot channel to generate transmission symbols. The pilot channel is transmitted using the short blocks (SB1 and SB2) shown in the subframe of FIG. 4.

The RF transmission section 320 performs a digital-to-analog conversion, a frequency conversion, band limiting and the like to transmit the transmission symbols using a radio frequency.

The power amplifier 322 adjusts the transmission power.

The duplexer 324 adequately separates the transmission signal from the received signal to provide two-way simultaneous communications.

The code information specifying section 330 specifies the code information including the CAZAC code sequence (sequence number), a cyclic shift amount of the CAZAC code sequence, and the information related to the transmission bandwidth used in the user equipment. The code information may be detected from the broadcasting information from the broadcasting channel or individually reported from the base station. Such an individual report may be transmitted using the upper-layer signaling using an L3 control channel or the like. In a case where the allocation information of the downlink data channel is not transmitted via a downlink L1/L2 control channel in, for example, user equipment employing the persistent scheduling, the code resource (i.e., the code information including the CAZAC code sequence (sequence number), the cyclic shift amount of the CAZAC code sequence, and the information related to the transmission bandwidth) transmitting the data arrival acknowledgement information (ACK/NACK) and/or the channel quality information (CQI) is individually reported to each user equipment in advance using the upper-layer signaling. As described in a second embodiment of the present invention below, the code information specifying section 330 also specifies which orthogonal code sequence is indicated by a group of factors (block spreading code sequence) to be multiplied to each of the plural blocks.

The CAZAC code generation section 332 generates the CAZAC code sequence in accordance with the sequence number specified in the code information.

The cyclic shift section 334 detects another CAZAC code sequence by cyclically shifting the CAZAC code sequence in accordance with the cyclic shift amount specified in the code information.

In the following, the CAZAC code is briefly described.

Figure 6:
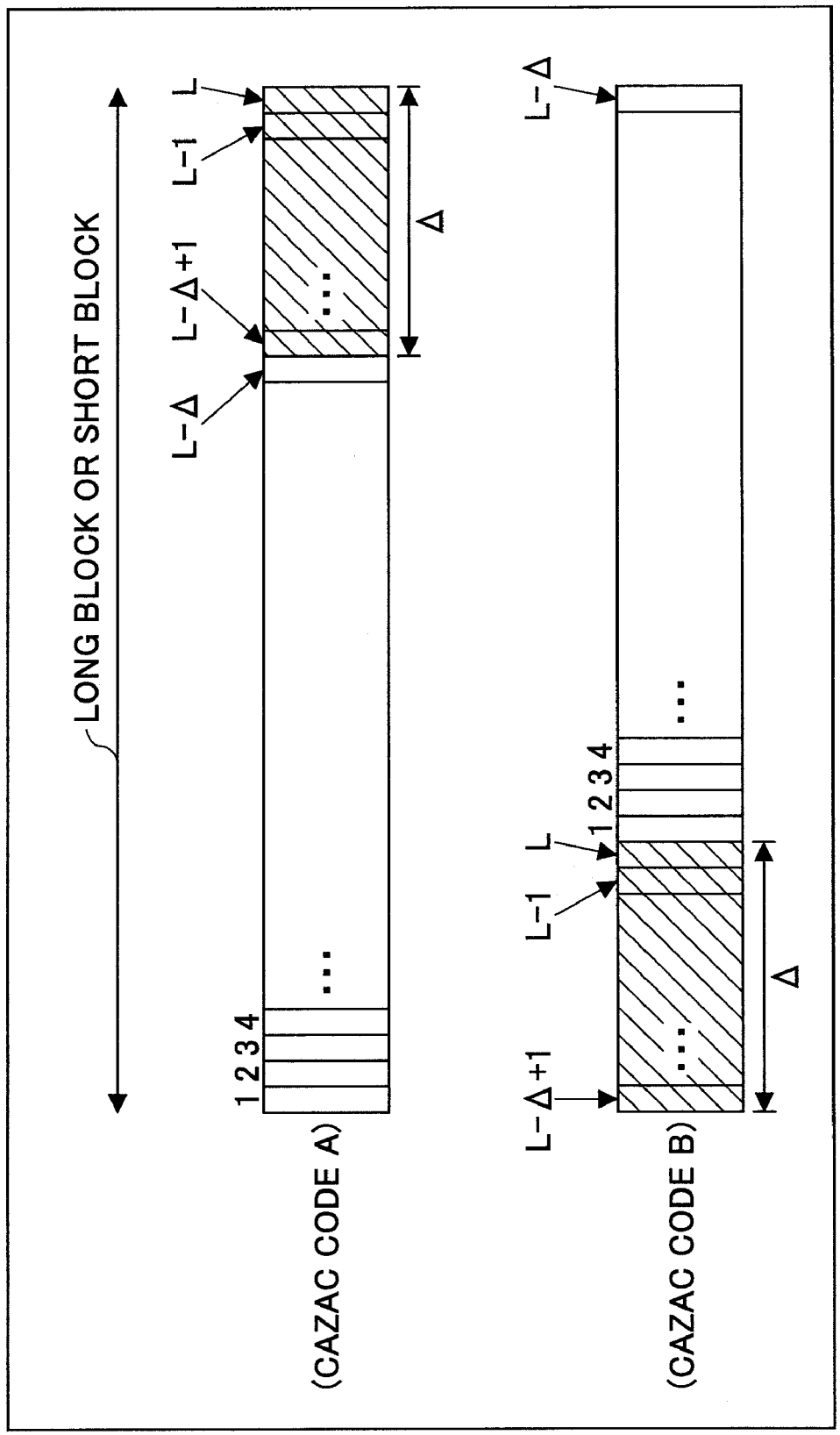
FIG. 6 is a drawing showing a characteristic of CAZAC code.

FIG. 6 shows an example of the CAZAC code. As shown in FIG. 6, the code length of the CAZAC code "A" is given as L. For explanation purpose, it is assumed that the length L corresponds to the period of L samples or L chips. However, this assumption is not essential to the present invention. The CAZAC code B (shown in bottom of FIG. 6) which is another CAZAC code is generated by shifting (moving) the last $\Delta$samples (hatched line part) including the last sample ($L^{th}$ sample) of the CAZAC code A to before the $1^{st}$ sample of the CAZAC code A. In this case, the CAZAC code A and the CAZAC code B become orthogonal with each other with respect to $\Delta$=(0 through (L-1)). In other words, a first CAZAC code and a second CAZAC code become orthogonal with each other when the second CAZAC code is generated by cyclically shifting a part of the first CAZAC code. Therefore, when a CAZAC code having a code length of L (L samples) is provided, theoretically, it becomes possible to provide L CAZAC codes which are orthogonal with each other. On the other hand, when a third CAZAC code is generated by a method other than cyclically shifting a part of a first CAZAC code, the third CAZAC code and the first CAZAC code do not become orthogonal with each other. However, the cross-correlation value between the first CAZAC code and a random code which is not a CAZAC code is much greater than the cross-correlation value between the first CAZAC code and the third CAZAC code. From this point of view as well, the CAZAC codes are preferably used even when the CAZAC codes are not necessarily orthogonal with each other in order to control (reduce) the cross-correlation value (interference value).

In this embodiment of the present invention, CAZAC codes having such characteristics are used in plural user equipment, the CAZAC codes being selected from a group of the CAZAC codes (which are generated by cyclically shifting a part of one of the CAZAC code included in the group of CAZAC codes). However, among those L CAZAC codes orthogonal with each other, $L/L_A$ CAZAC codes are actually used as the pilot channels of the user equipment (moving stations), each of the $L/L_A$ CAZAC codes being generated by cyclically shifted by $\Delta = n \times L_A$ from an original CAZAC code (where, n=0, 1, . . . , (L-1/L$_{66}$)). Wherein, the symbol "$L_A$" denotes a value determined based on a multipath propagation delay amount. By doing this, it may become possible to appropriately maintain the orthogonality between uplink control channels transmitted from plural user equipment even under a multipath environment. Details of CAZAC codes are described in documents such as D. C. Chu, "Polyphase codes with good periodic correlation properties", IEEE Trans. Inform. Theory, vol. IT-18, pp. 531-532, July 1972; 3GPP, R1-050822, Texas Instruments, "On allocation of uplink sub-channels in EUTRA SC-FDMA".

The frequency setting section 336 in FIG. 3 specifies which frequency is to be used for each user equipment when the FDM (Frequency Domain Multiplexing) method is used for the transmission of the uplink control channel from plural user equipment.

The pilot signal generation section 338 provides a pilot channel to be included in the uplink control channel. As described above, the pilot channel is transmitted by using the short blocks (SB1, SB2) shown in the subframe configuration of FIG. 4. The pilot channel includes any CAZAC code allocated to each user equipment. The CAZAC code for the pilot channel may be specified by the sequence number and the cyclic shift amount. Generally, the length, the period, or the number of chips of the long block (LB) is different from those of the short block (SB). Therefore, the CAZAC code $C_L$ to be included in the long block (LB) and the CAZAC code $C_s$ to be included in the short block (SB) may be separately provided. However, those CAZAC code $C_L$ and CAZAC code $C_s$ are used in the same user equipment, therefore the CAZAC code $C_L$ and the CAZAC code $C_s$ may be related with each other (such as a part of CAZAC code $C_L$ constitutes the CAZAC code $C_s$).

Figure 7:
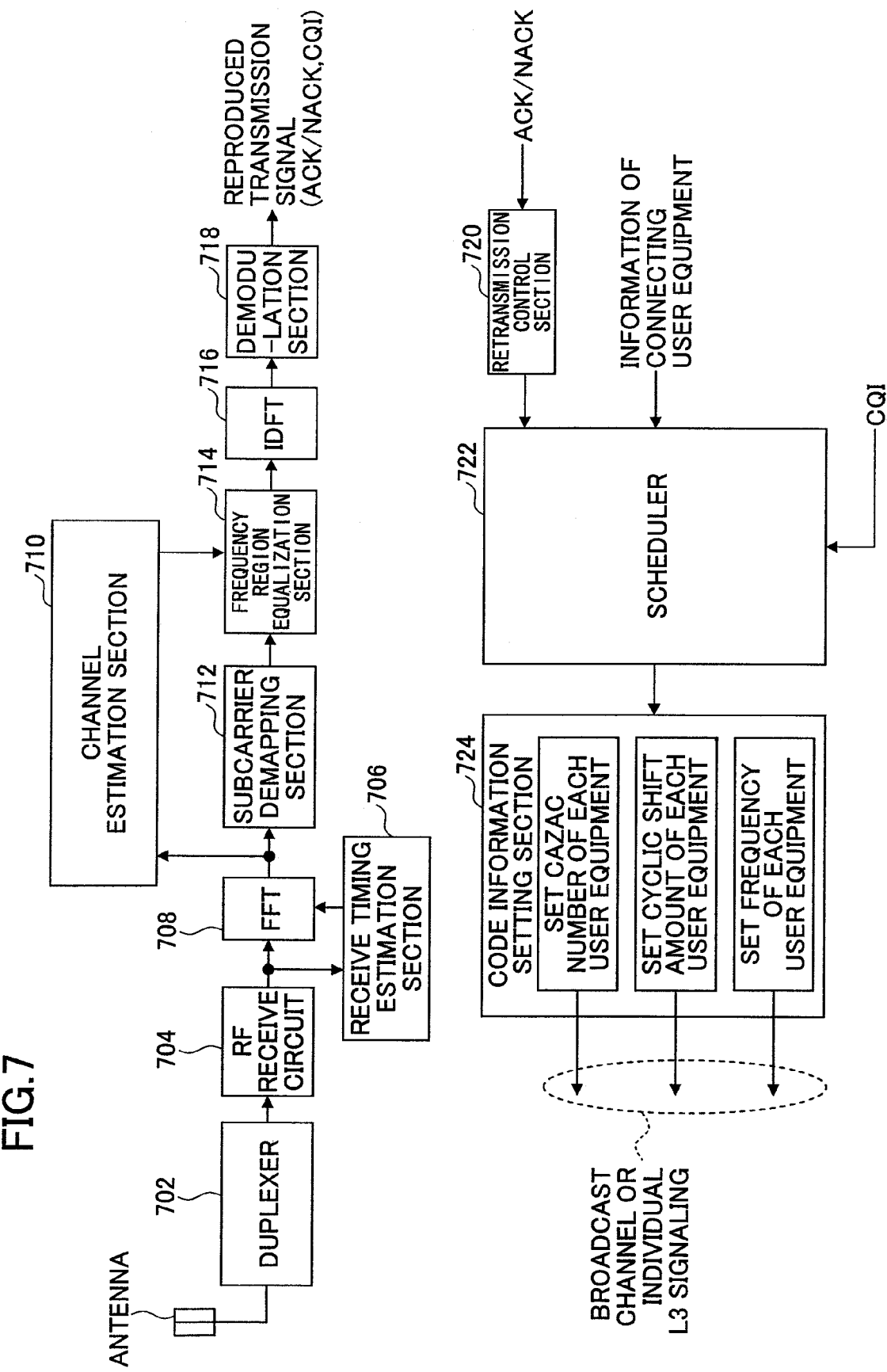
FIG. 7 is a block diagram showing a base station apparatus according to an embodiment of the present invention.

FIG. 7 shows an exemplary configuration of a base station apparatus according to an embodiment of the present invention. As shown in FIG. 7, the base station apparatus includes a duplexer 702, an RF receive section 704, a receive timing estimation section 706, an FFT (Fast Fourier Transform) section 708, a channel estimation section 710, a subcarrier demapping section 712, a frequency region equalization section 714, an IDFT (Inverse DFT) section 716, a demodulation section 718, a retransmission control section 720, a scheduler 722, and a code information setting section 724.

The duplexer 702 adequately separates the transmission signal from the received signal to provide two-way simultaneous communications.

The RF receive section 704 performs a digital-to-analog conversion, a frequency conversion, band limiting and the like so as to process received symbols in a baseband.

The receive timing estimation section 706 specifies a received timing based on a synchronization channel or the pilot channel in the received signal.

The FFT section 708 performs a Fourier transformation to convert time-domain data into frequency-domain data.

The channel estimation section 710 estimates the channel quality of an uplink channel based on the receive quality of an uplink pilot channel and outputs data for channel compensation (channel estimation value).

The subcarrier demapping section 712 performs a demapping on a frequency domain. This process is performed in response to the mapping process performed on the frequency domain in each user equipment.

The frequency region equalization section 714, performs equalization on the received signals based on the channel estimation values.

The IDFT section 716, performs an IDFT (Inverse Discrete Fourier Transform) process to return from a frequency-domain signal back to a time-domain signal.

The demodulation section 718 demodulates the received signals. In the embodiment of the present invention, the uplink control channel is demodulated and outputs the channel quality information (CQI) of a downlink channel and the data arrival acknowledgement information (ACK/NACK) of the downlink data channel.

The retransmission control section 720, provides new packet data or packet data to be retransmitted based on the content of the data arrival acknowledgement information (ACK/NACK).

The scheduler 722 determines the allocation of downlink resources based on the result of the channel quality information (CQI) of the downlink channel and some other criterion. The scheduler 722 further determines the allocation of uplink resources based on the received result of the pilot channel transmitted from each user equipment and some other criterion. The determined results are output as scheduling information. The scheduling information specifies information items such as frequency, time, and transmission format (data modulation method, channel coding rate and the like) used for signal transmission. When the traffic such as VoIP traffic in which data are periodically generated is to be processed, the scheduler 722 applies the persistent scheduling so that predetermined radio resources are periodically allocated.

The code information setting section 724 specifies, based on the allocation result from the scheduler 722, the code information including the sequence number indicating the CAZAC code, the cyclic shift amount, and usable frequency bandwidth used in the uplink from the user equipment. The code information may be simultaneously broadcasted to each user equipment using a broadcast channel or individually reported to each user equipment. In the former case, each user equipment is required to uniquely detect the code information specific to the user equipment. When the persistent scheduling is applied to user equipment, the code resource (i.e., the code information including the CAZAC code sequence (sequence number), the cyclic shift amount of the CAZAC code sequence, and the information related to the transmission bandwidth) transmitting the data arrival acknowledgement information (ACK/NACK) and/or the channel quality information (CQI) is individually reported to each user equipment in advance using the upper-layer signaling.

Figure 8:
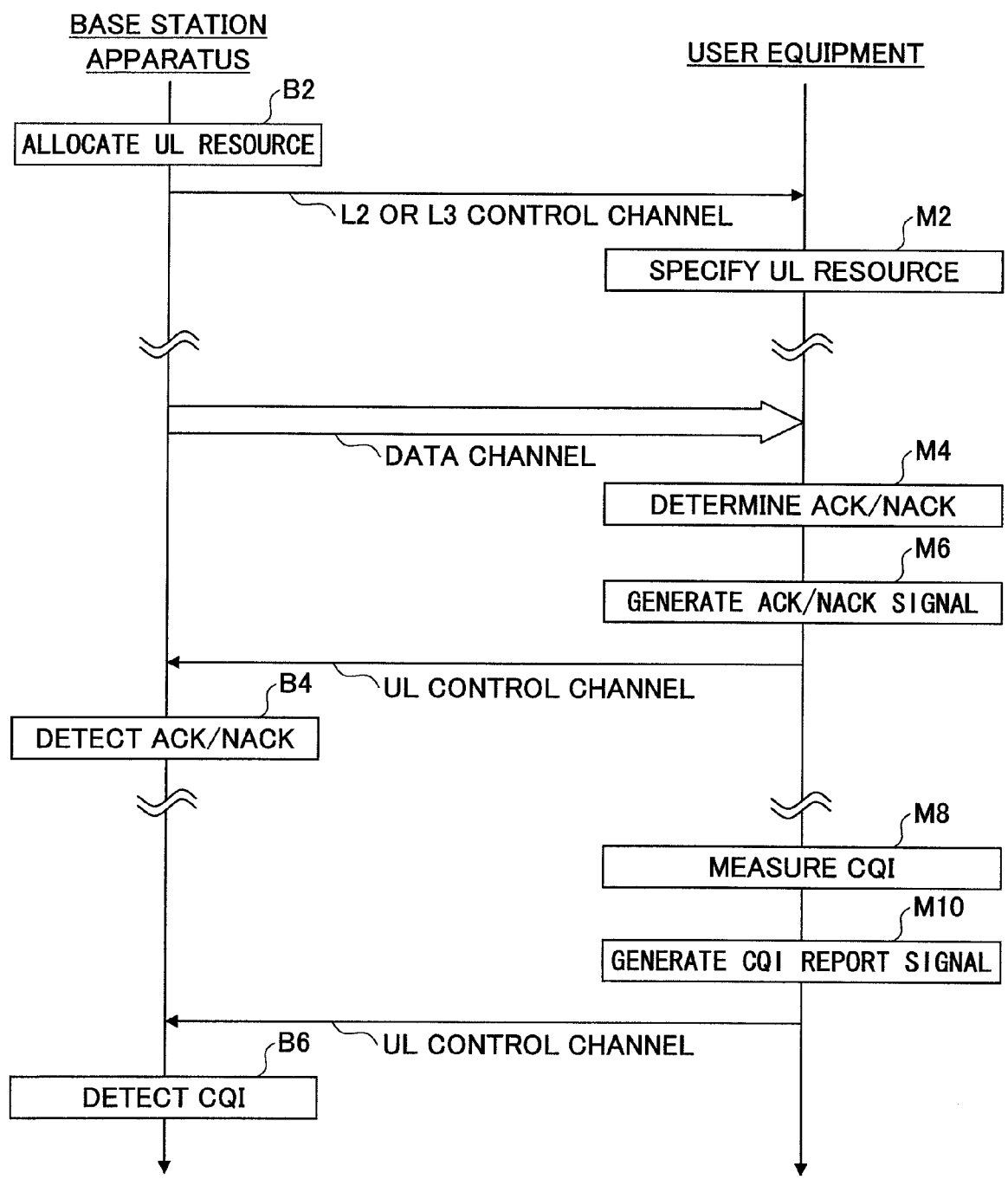
FIG. 8 is a sequence diagram showing operations according to an embodiment of the present invention.

FIG. 8 shows exemplary operations according to an embodiment of the present invention. In this example, with respect to user equipment to which the persistent scheduling is applied, the code resource (i.e., the code information including the CAZAC code sequence (sequence number), the cyclic shift amount of the CAZAC code sequence, and the information related to the transmission bandwidth) transmitting the data arrival acknowledgement information (ACK/NACK) and/or the channel quality information (CQI) is individually reported to each user equipment in advance using the upper-layer signaling.

The user equipment to which the persistent scheduling is applied uniquely detects the code information specific to the user equipment from the upper-layer signaling. Generally, the code information may include items such as that N sequences (C#1, C#2, . . . , C#N) are provided as the CAZAC code sequences used in the cell, that M cyclic shift amounts (0, $L_A$, . . . , $(M-1) \times L_A$) are provided with respect to each CAZAC code sequence, that the Frequency Domain Multiplexing (FDM) is to be used, and that there are F usable frequency bandwidths (Bw1, Bw2, . . . , BwF).

In step B2 of FIG. 8, uplink resources are allocated in the base station apparatus. The allocation of the uplink resources is performed when the communication starts. The uplink resources include the information of the time-frequency resources and the code resource with respect to the transmission of the data arrival acknowledgement information (ACK/NACK) and the transmission of a CQI release request. These allocation results are reported to user equipment using an L2 (MAC) or an L3 (RRC) signaling.

In step M2, the user equipment specifies the information of the resources used in uplink (the code information for the user equipment) based on the information in the L2 (MAC) or the L3 (RRC) signaling.

Figure 9:
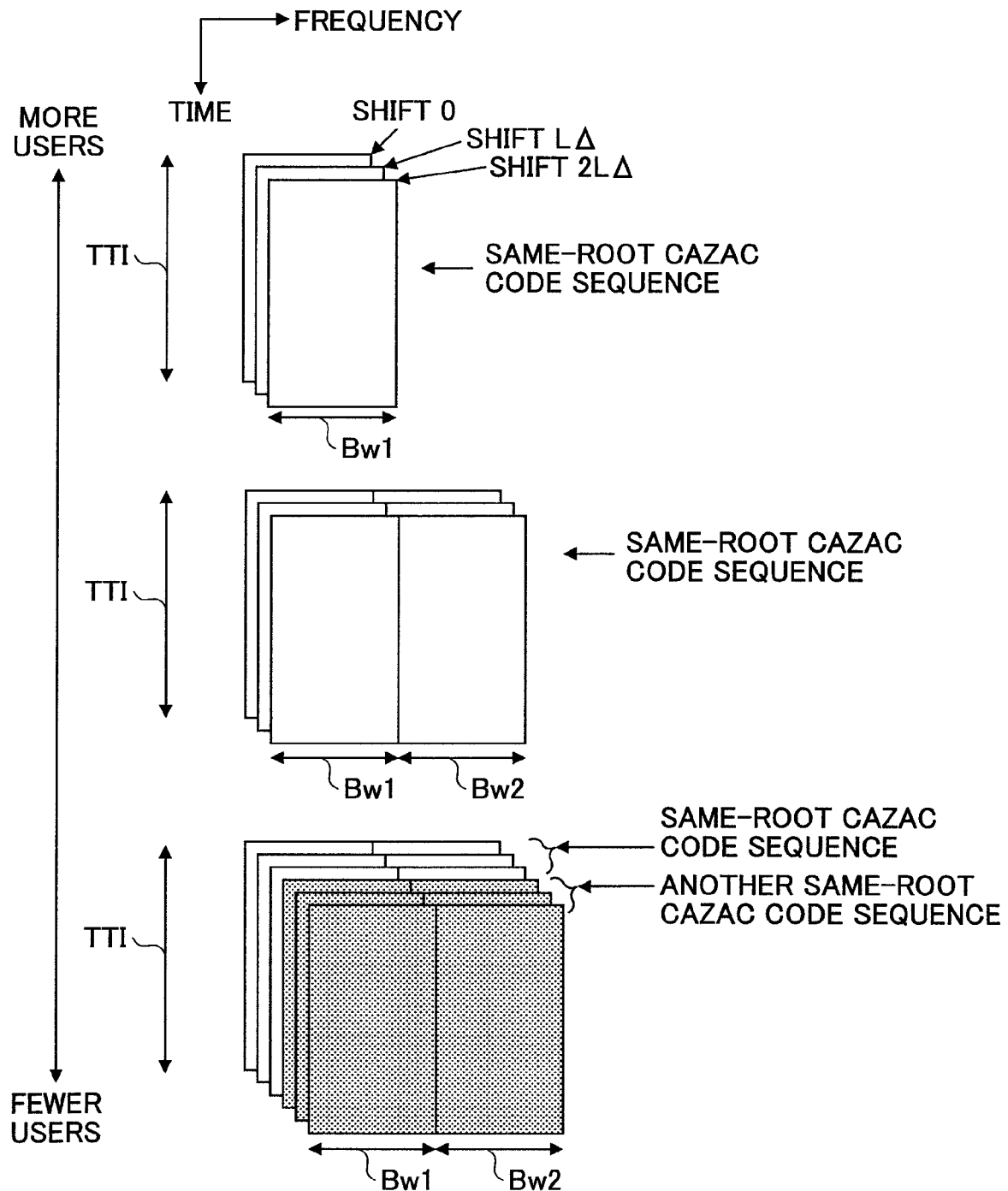
FIG. 9 is a drawing showing examples of settings of CAZAC sequences, cyclic shift amounts, and frequency bandwidths.

FIG. 9 shows exemplary patterns of the combinations of the CAZAC code, the cyclic shift amount, and the frequency bandwidths. As shown in FIG. 9, first, plural user equipment is multiplexed with each other using the code domain multiplexing (CDM) method using the same-root CAZAC codes (which are orthogonal to each other when the CAZAC codes are included in the same-root CAZAC codes). When the number of the user equipment (users) increases, the users are code-multiplexed by using the same CAZAC code sequence in a different (another) frequency bandwidth. When the number of the users further increases, still another usable frequency bandwidth is additionally provided and the CDM is performed in each of the usable frequency bandwidths. In other words, both the CDM and the FDM can be performed. However, the CDM is preferentially performed. When the number of users further increases and exceeds the number of users that can be multiplexed by the CDM and the FDM using only one same-root CAZAC code sequences, another same-root CAZAC code sequences are provided to multiplex the users using the CDM or using both the CDM and the FDM. When N same-root CAZAC code sequences (C#1, C#2, . . . , C#N) are provided, M cyclic shift amounts (0, $L_A$, . . . , $(M-1) \times L_A$) are provided with respect to each CAZAC code sequence, the frequency domain multiplexing (FDM) is used, and F usable frequency bandwidths (Bw1, Bw2, . . . , BwF) are provided, the sequence number of the CAZAC code is expressed by Round up value after the decimal point of $(P/(M \times F))$ The $((P-(n-1) \times (M \times F))/M)^{th}$ frequency bandwidth is used, and the cyclic shift amount is given by $$L_A \text{ times of } \{P-(n-1) \times (M \times F)) - (f-1) \times M\} = P \bmod M.$$

In the example of FIG. 9, when the multiplexed number of the users exceeds 3, another frequency bandwidth Bw2 is provided to be used. However, instead of doing this, when the number of users are more than 3 and equal to or less than 6, it may be possible to add another CAZAC code sequence #2 while using the same band frequency bandwidth Bw1. This is because the CAZAC code sequence C#2 cannot be generated by cyclically shifting a part of the CAZAC code sequence C#1 and vice versa, and the CAZAC code sequences C#1 and C#2 are not orthogonal with each other, but the cross-correlation value between the CAZAC code sequences C#1 and C#2 becomes relatively small enough. The specified code information is reported to each of the CAZAC code generation section 332, the cyclic shift section 334, the frequency setting section 336, and the pilot signal generation section 338.

Referring back to FIG. 8, in step M4, the user equipment determines whether there is any error in each packet data of the downlink data channel. The error detection may be based on the CRC (Cyclic Redundancy Check) method or any other appropriate known detection method in this technical field. The acknowledge response (ACK) indicating that there is no error detected or the detected error is within the allowable range or the negative acknowledge response (NACK) indicating that an error is detected is determined with respect to each packet data. The acknowledge response (ACK) and the negative acknowledge response (NACK) constitute the data arrival acknowledgement information (ACK/NACK).

In step M6 of FIG. 8, the user equipment generates the data arrival acknowledgement information (ACK/NACK) based on the results of the data arrival acknowledgement determined in step M4. The generated data arrival acknowledgement information (ACK/NACK) is transmitted using the frequency and the code resource allocated for the transmission of the data arrival acknowledgement information (ACK/NACK).

In step B4, the base station apparatus receives and demodulates the uplink control channel from plural user equipment.

Each user equipment transmits a similar uplink control channel but uses any of the CAZAC code sequence having a different cyclic shift amount, a different frequency, or a different CAZAC code sequence from that of any other user equipment. As described above, in each long block (LB), a single factor is multiplied to the entire CAZAC code. Therefore, the base station apparatus can add the uplink control channels having the same phase, the uplink control channels being transmitted from each user equipment. As a result, the orthogonality between the same-root CAZAC codes having different cyclic shift amounts can be maintained, thereby allowing the base station apparatus to perform an orthogonal separation of the signals from plural user equipment. Even when the CAZAC codes which are not orthogonal with each other are being used, it may become possible to separate the signals from the plural user equipment with a relatively lower interference level compared with a case where a random sequence is used. Further, by determining the contents of the twelve (12) factors (first through twelfth factors) used for the uplink control channel of each user equipment, it may become possible to determine the content of the data arrival acknowledgement information (ACK/NACK) and/or the channel quality information (CQI).

In step M8, the user equipment measures the receiving quality of a downlink pilot channel and detects the CQI (Channel Quality Indicator) by converting the measured value into a value within a certain range. For example, when the receiving quality is classified into thirty-two (32) levels, by converting the current receiving quality (such as SIR) into a value corresponding to one of the 32 levels, it becomes possible to detect (indicate) the CQI by using five (5) bits. The user equipment to which the persistent scheduling is applied measures the receiving quality (CQI) of the downlink channel based on the period specified by the base station apparatus.

It is not essential to the present invention to performs step M4 and step M8 in this order. Namely, the determination of the data arrival acknowledgement information (ACK/NACK) and the measurement of receiving quality (CQI) may be performed any time in the operations.

In step M10, the user equipment generates the uplink control channel for reporting the CQI (Channel Quality Indicator) to the base station apparatus. As described above, the block-based modulation pattern generation section 306 in FIG. 3 provides one factor with respect to each of the twelve (12) large blocks so that in total twelve (12) factors (first through twelfth factors) are provided with respect to each TTI. One or more factors of the twelve (12) factors indicate the data arrival acknowledgement information (ACK/NACK) or the CQI (Channel Quality Indicator). The upper control channel may have a subframe structure as shown in FIGS. 4 and 5. For example, by multiplying the first factor to the entire of one CAZAC code sequence (already cyclically shifted) allocated to the user equipment, the first long block (LB1) is generated. By multiplying the second factor to the same CAZAC code sequence, the second long block (LB2) is generated. In the same manner, by multiplying the $K^{th}$ factor to the sane CAZAC code sequence, the $K^{th}$ long block (LBk) is generated. By repeating this, a frame for the uplink control channel having twelve (12) long blocks (LBs) is generated. More precisely, the frame includes a pilot channel having a CAZAC code.

The uplink control channel generated as described above is transmitted from the user equipment to the base station apparatus using a dedicated frequency bandwidth. The user equipment to which the persistent scheduling is applied transmits the measured receiving quality (CQI) of the downlink channel using the time, the frequency resource, and the code resource specified by the base station apparatus for the transmission of the signal for reporting the receiving quality (CQI) of the downlink channel.

Embodiment 2

Figure 10:
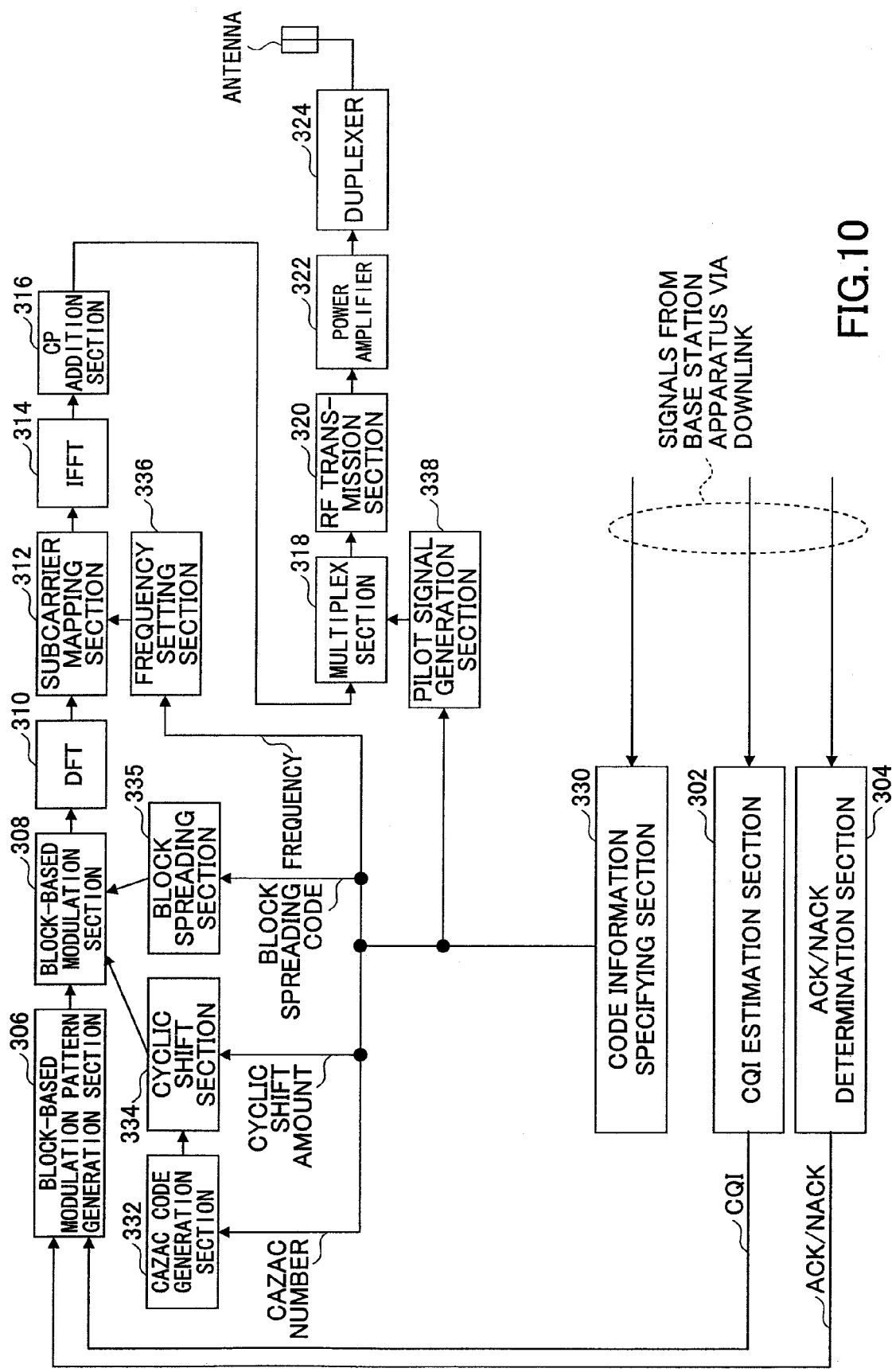
FIG. 10 is a block diagram showing user equipment using a block spreading code according to an embodiment of the present invention.

FIG. 10 shows a configuration of user equipment using a block spreading code according to a second embodiment of the present invention. The configuration of the user equipment in FIG. 10 is almost similar to that of the user equipment in FIG. 3 but is greatly different in that the user equipment in FIG. 10 uses a block spreading code (BLSC). As shown in FIG. 10, the user equipment further includes a block spreading section 335. The block spreading section 335 provides a group of a predetermined number of factors (block spreading code), so that each factor is multiplied to the corresponding long block (LB). The block spreading code is an orthogonal code sequence and which orthogonal code sequence is used is specified by the information from the code information specifying section 330.

Figure 11:
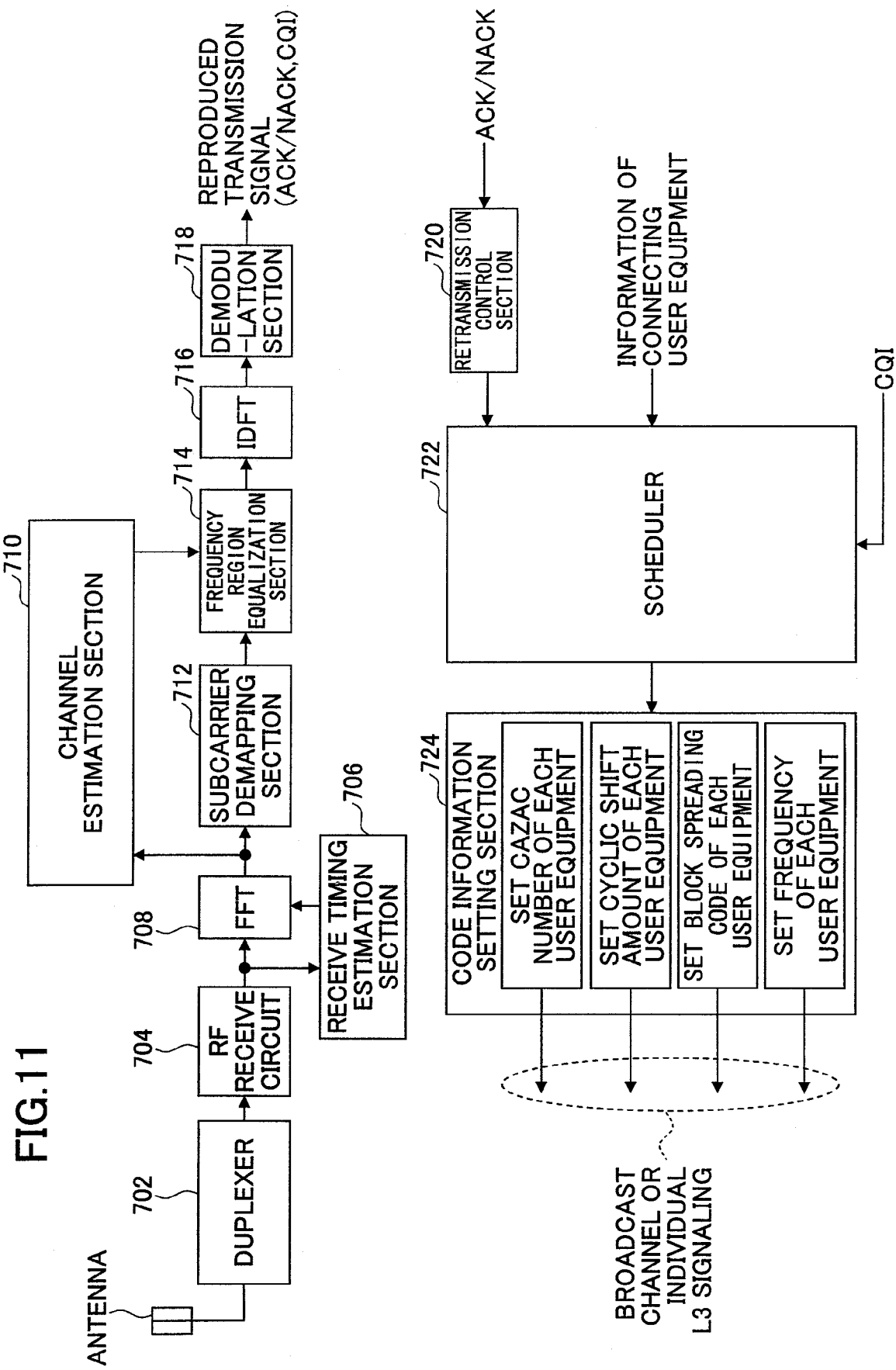
FIG. 11 is a block diagram showing a base station apparatus using a block spreading code according to an embodiment of the present invention.

FIG. 11 shows a configuration of a base station apparatus using the block spreading code according to the second embodiment of the present invention. The configuration of the base station apparatus in FIG. 11 is almost similar to that of the base station apparatus in FIG. 7 but is greatly different in that the user equipment in FIG. 11 uses the block spreading code (BLSC). As shown in FIG. 11, the base station apparatus further includes a code information setting section 724. The code information setting section 724 specifies not only the sequence number indicating the CAZAC code sequence, the cyclic shift amount, and the usable frequency bandwidth but also the information indicating what is the block spreading code (code information). In this embodiment of the present invention, with respect to the user equipment to which the persistent scheduling is applied, the base station apparatus specifies two types of code resources which are a code resource for transmitting the data arrival acknowledgement information (ACK/NACK) and a code resource for transmitting the CQI (Channel Quality Indicator).

Figure 12:
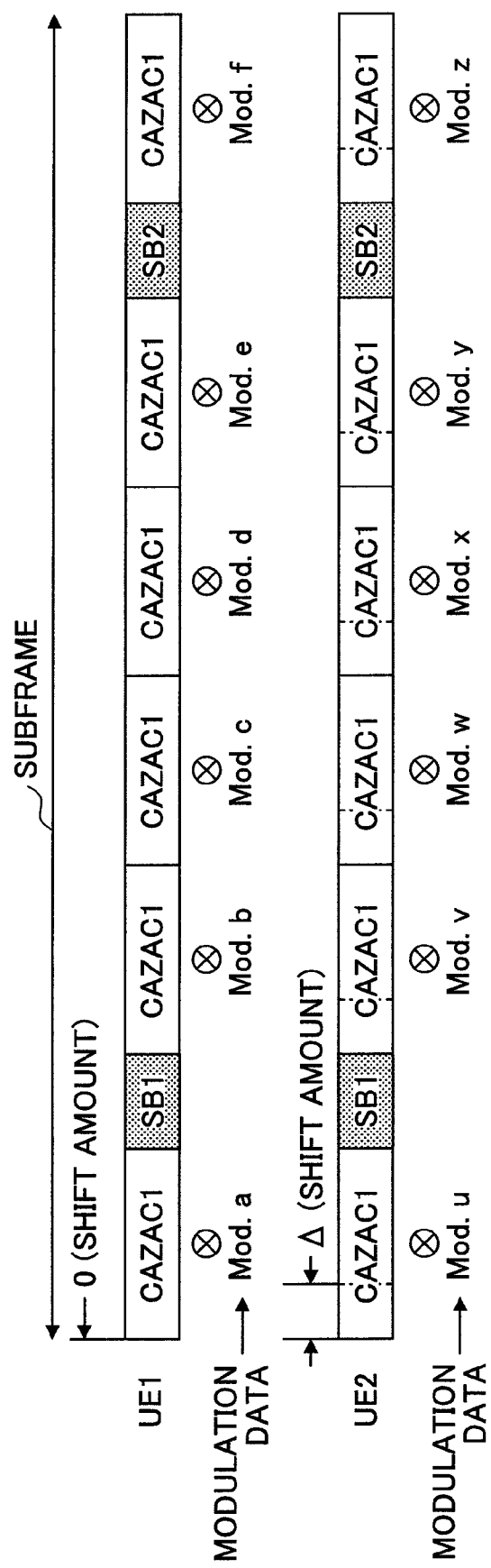
FIG. 12 is a drawing showing factors to be multiplied to the long blocks (LBs)

FIG. 12 shows subframes of first user equipment UE1 and second user equipment UE2 without any block spreading code being multiplied to the subframes. Both first and second user equipment use a certain CAZAC code sequence (CAZAC1), but the second user equipment uses the CAZAC code sequence (CAZAC1) having the cyclic shift amount of "Δ" which is different from that used in the first user equipment. Therefore, the two subframes transmitted from the user equipment become orthogonal with each other. In FIG. 12, the symbol "Mode.a" denotes data to be used to modulate, or a factor to be multiplied to, the first long block (LB1). The symbols "Mode.a" through "Mode.f" correspond to first through sixth factors (or seventh through twelfth factors), respectively, of the first user equipment UE1. The symbols "Mode.u" through "Mode.z" correspond to first through sixth factors (or seventh through twelfth factors), respectively, of the second user equipment UE2.

Figure 13:
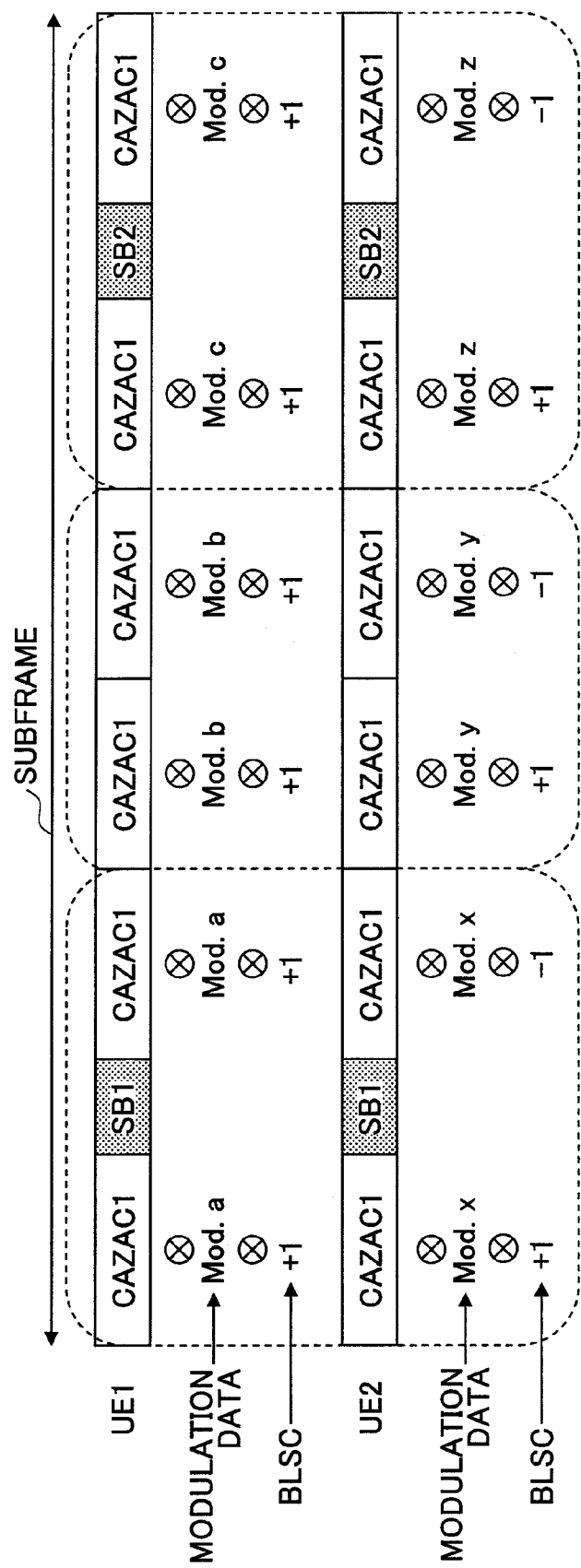
FIG. 13 is a drawing showing specific examples of factors and block spreading codes (BLSCs) to be multiplied to the long blocks (LBs)

FIG. 13 shows a case where each block spreading code (BLSC) is multiplied to the corresponding long block (LB) of the first user equipment UE1 and the second user equipment UE2. In the example of FIG. 13, (besides the "modulation data" in FIG. 13), factors are provided with respect to each of two long blocks (LBs). The factors constitute the block spreading code (BLSC), and, as indicated in a dotted frame, an orthogonal code (1,1) is provided for the first user equipment UE1 and another orthogonal code (1,−1) is provided for the second user equipment UE2.

As described in the first embodiment of the present invention, as long as the same factor (value) is multiplied to one or more long blocks (LBs), the orthogonality between the CAZAC codes constituting the long blocks (BLs) can be maintained. Therefore, as shown in FIG. 13, when plural groups of factors multiplied to plural blocks are provided as codes orthogonal between the plural user equipment, it may become possible to provide orthogonality between users by using the codes while maintaining the orthogonality between the CAZAC codes. However, the plural blocks to which one orthogonal code is multiplied are required to have the same content (data). In the example of FIG. 13, in the user equipment UE1, both first and second factors are "Mod.a", both third and fourth factors are "Mod.b", and both fifth and sixth factors are "Mod.c". In the same manner, in the user equipment UE2, both first and second factors are "Mod.x", both third and fourth factors are "Mod.y", and both fifth and sixth factors are "Mod.z". Because of the limitation, the content that can be transmitted using first through twelfth factors may be limited to some extent. However, as described with reference to FIG. 5, the number of bits required to indicate the data arrival acknowledgement information (ACK/NACK) and the like is relatively small, however, such a limitation may not become crucial.

By using the block spreading codes (BLSCs) (1,1) and (1,−1), it becomes possible to distinguish the first user equipment UE1 from the second user equipment UE2. This means that the same cyclic shift amount of the CAZAC code can be used in both first and second user equipment (i.e., it is not essential to use different cyclic shift amounts of the CAZAC code between first and second user equipment). For explanation purpose, the factors to be multiplied to the long blocks (LBs) are described. However, any factors to be multiplied to the short blocks (SBs) may be additionally provided.

Figure 14:
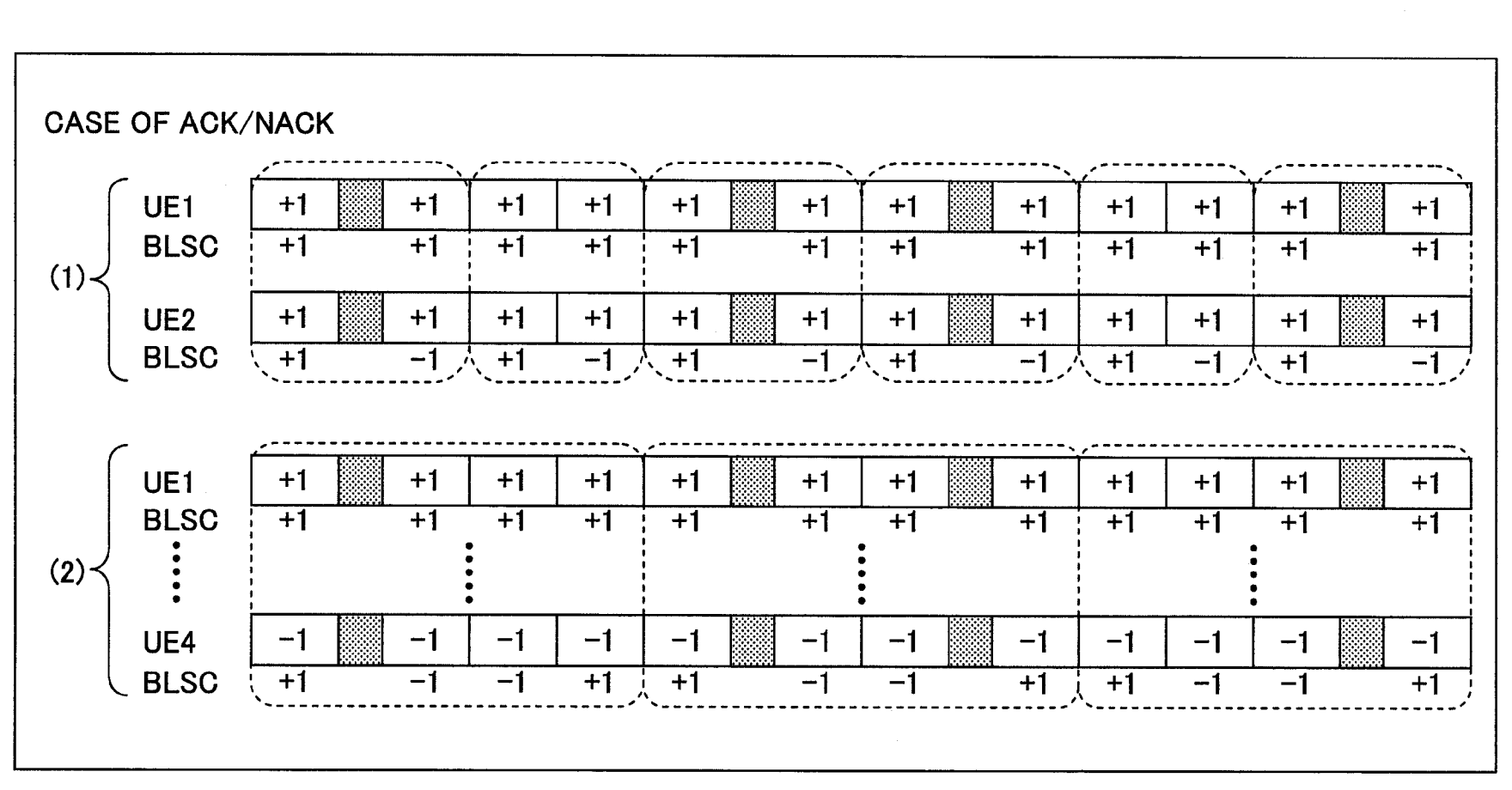

FIG. 14 shows specific examples of first through twelfth factors and the block spreading codes (BLSCs). Part (1) of FIG. 14 shows a case similar to the case shown in FIG. 13 and where it is assumed that those first through twelfth factors represent (constitute) the acknowledge response (ACK). Further, in part (1) of FIG. 14, two different orthogonal code sequences are provided and multiplied to each of two blocks of the first user equipment UE1 and the second user equipment UE2 to distinguish the first user equipment UE1 from the second user equipment UE2.

A part (2) of FIG. 14 shows a case where the length of the orthogonal spreading code corresponds to four (4) long blocks (LBs). In this case, each of four (4) factors is multiplied to the corresponding long blocks (LBs) and four (4) users are code-multiplexed. In this example, the following four (4) orthogonal codes are used.

(+1, +1, +1, +1), (+1, −1, +1, −1), (+1, +1, −1, −1), and (+1, −1, −1, +1).

In this case as well, as described above, it is required that the same data (e.g., "Mod.a" for the first user terminal) are modulated in the four (4) long blocks in the subframe transmitted from the same user equipment. The length of the orthogonal spreading code is not limited to 2 or 4 as described above. Any other appropriate length of the orthogonal code may be used. Further, the length of the orthogonal (spreading) code may be determined by, for example, the base station apparatus depending on the number of users, the usable frequency bandwidth and the like.

Further, as the orthogonal code, any appropriate orthogonal code may be used. As shown in the figures, values "+1" and "−1" may be used as the components of the orthogonal codes. Further, phase factors such as the following example may be used.

(1, 1, 1), (1, exp(j2Π/3), exp(j4Π/3)), and (+1, exp(j4Π/3), exp(j2Π/3)).

As described above, the number of bits required to indicate the data arrival acknowledgement information (ACK/NACK) is relatively small. Therefore, by using such block spreading codes (BLSCs), it may become possible to provide orthogonality between users while maintaining the orthogonality between the CAZAC codes. However, on the other hand, the number of bits required to indicate the channel quality information (CQI) is relatively large. Therefore, the block spreading code (BLSC) may not be used. Therefore, when the block spreading codes (BLSCs) are used with respect to the data arrival acknowledgement information (ACK/NACK), two types of code resources are specified, one of the code resource being for transmitting the data arrival acknowledgement information (ACK/NACK), and the other code resource being for transmitting the channel quality information (CQI).

As described in the first embodiment of the present invention, when no block spreading code (BLSC) is used, it is possible to transmit both the data arrival acknowledgement information (ACK/NACK) and the channel quality information (CQI) by using one type of code resource. According to the second embodiment of the present invention, by using the block spreading code (BLSC), it may become possible to increase the number of multiplexed users for the transmission of the data arrival acknowledgement information (ACK/NACK).

Namely, when the block spreading code (BLSC) is to be applied to the user equipment to which the persistent scheduling is applied, since the block spreading code (BLSC) may not be used for the transmission of the channel quality information (CQI), two types of code resources, one of which is for transmitting the data arrival acknowledgement information (ACK/NACK) and the other of which is for transmitting the channel quality information (CQI), are specified.

According to the second embodiment of the present invention, by using not only the cyclic shift amount of the CAZAC code but also the block spreading code (BLSC), it may become possible to ensure a larger number of orthogonal code multiplex than in a case of the first embodiment of the present invention. When both the CDM and the FDM are being used together, since the number of possible orthogonal multiplex can be increased, it may become possible to control (reduce) the frequency of changes of frequency bandwidths caused by using the FDM, thereby greatly reducing the frequency of reporting the changes of the frequency bandwidths and the radio resources required to be used to transmit the report.

As described in the first embodiment of the present invention, when no block spreading code (BLSC) is applied to the user equipment to which the persistent scheduling is applied, it is possible to use the same code resource for the transmission of the data arrival acknowledgement information (ACK/NACK) and for the transmission of the channel quality information (CQI). Therefore, in this case, only one type of code resource is specified. When one bit data such as the data arrival acknowledgement information (ACK/NACK) is transmitted, by using the block spreading code (BLSC), it may become possible to increase the number of multiplexed users. In this case, the maximum multiplexed number is given by the following formula:

(number of CAZAC code sequences)×(number of cyclic shift amount of CAZAC code sequences)× (number of block spreading codes (BLSCs))

Figure 15:
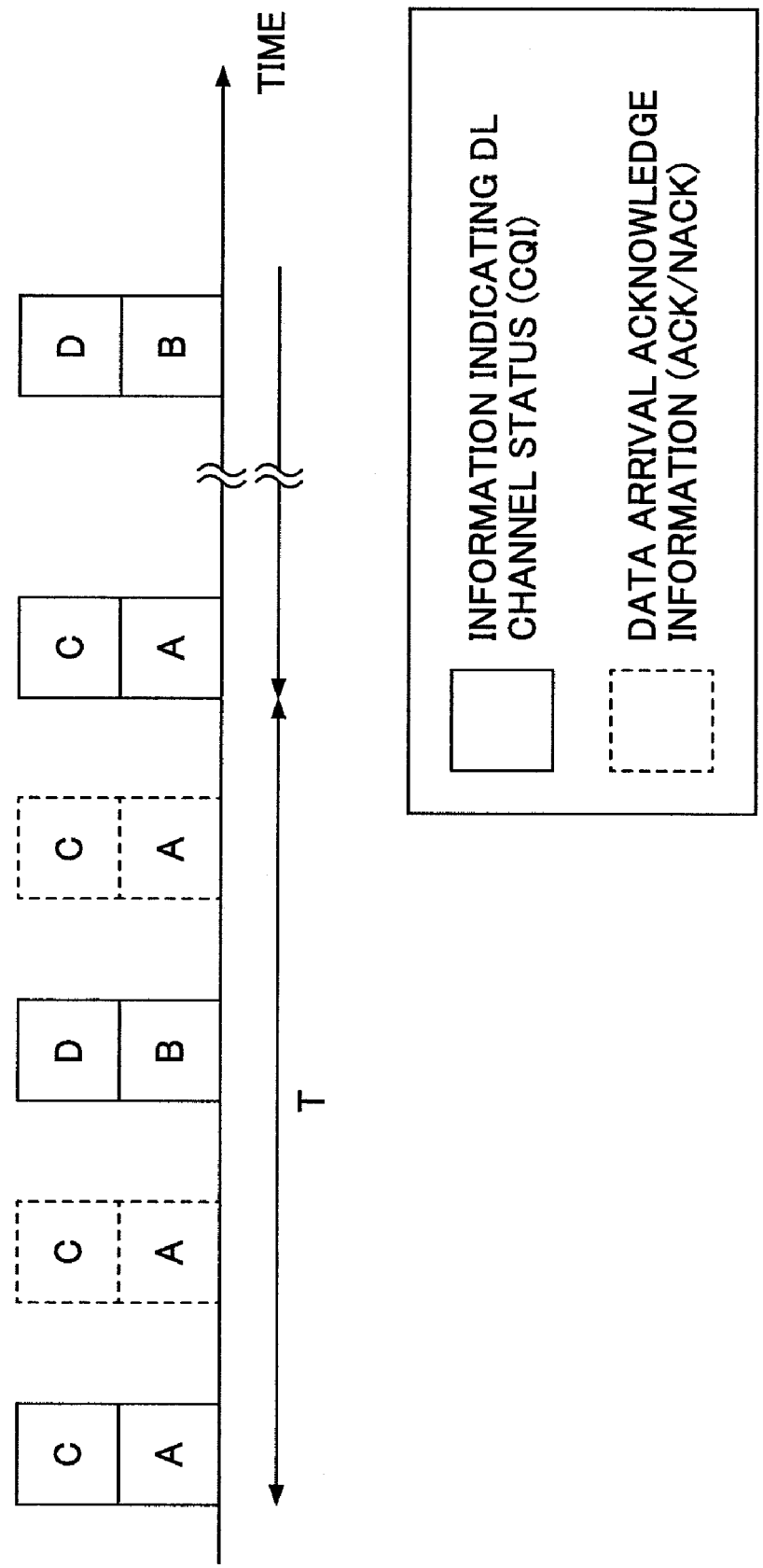
FIG. 15 is a drawing showing an example of feedback timings of data arrival acknowledgement information (ACK/NACK) and channel quality information (CQI)

A further explanation is given with reference to FIG. 15. FIG. 15 shows the transmission timings for transmitting the information indicating downlink channel quality (CQI) and the data arrival acknowledgement information (ACK/NACK) from each user. Symbols "A", "B", "C", and "D" denote users (user equipment) to which the persistent scheduling is applied, and the same code resource is allocated to those users. Unlike a case where fast packet scheduling in a frequency domain allocating resource blocks based on the frequency selectivity of the received channel status is applied to users, in a case where the persistent scheduling is applied to users, the users already know the positions where the data are mapped. Therefore, it is not necessary to report allocation information indicating the positions onto which the data are mapped to the users. Further, the users already know the timings when the data are to be transmitted, therefore, the timing when the data arrival acknowledgement information (ACK/NACK) is to be fed-back is determined in advance. Therefore, as long as no code resources are overlapped within the same TTI between the users transmitting the data arrival acknowledgement information (ACK/NACK) as feedback data, any code resource for transmitting feedback data such as L1/L2 control information and the channel quality information (CQI) but not for transmitting the data arrival acknowledgement information (ACK/NACK) may be used as the code resource for transmitting the data arrival acknowledgement information (ACK/NACK).

As shown in FIG. 15, the user A transmits (feeds back) the channel quality information (CQI) at a cycle T. Since the timing when the data arrival acknowledgement information (ACK/NACK) is fed back and the timing when the channel quality information (CQI) is fed back are separated in time domain, the same code resource may be used. However, as described above, when the same code resource is commonly used for the transmission of the data arrival acknowledgement information (ACK/NACK) and the transmission of the channel quality information (CQI), the number of reusing the same code resource may be limited because the control procedure becomes complicated and there is a limit of interval between those timings. From the point of view of resolving the problem, preferably, two types of code resource, one of which is for the transmission of the data arrival acknowledgement information (ACK/NACK) and the other of which is for the transmission of the channel quality information (CQI) are used.

Further, from the point view that the data arrival acknowledgement information (ACK/NACK) and the channel quality information (CQI) can be transmitted by using the same code resource, when the transmission timings of transmitting the data arrival acknowledgement information (ACK/NACK) are the same between users, it is preferable that different code resources are allocated between the users.

Figure 16:
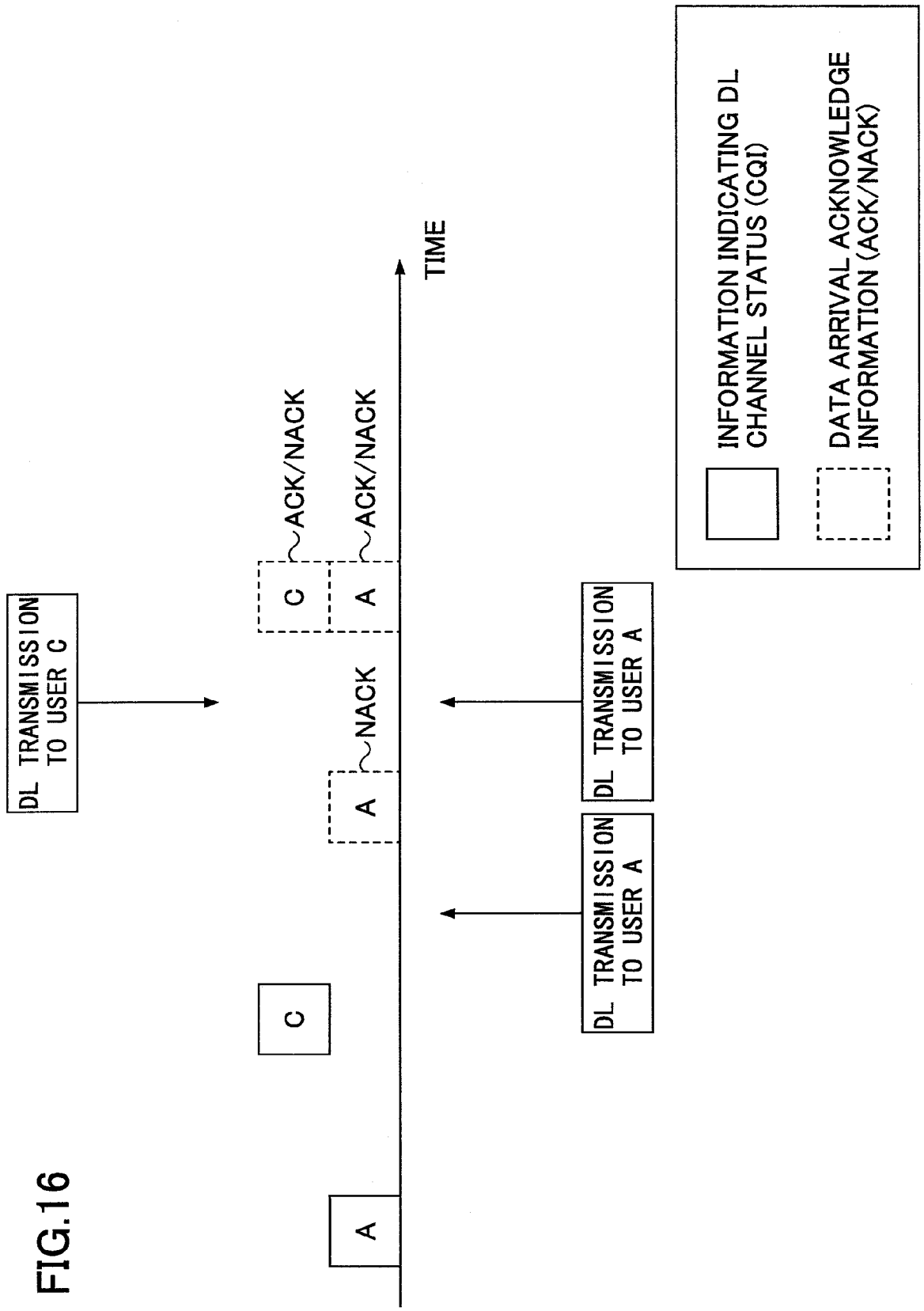
FIG. 16 is a drawing showing another example of feedback timings of the data arrival acknowledgement information (ACK/NACK) and the channel quality information (CQI).

Next, another case is described with reference to FIG. 16 where the transmission timing for transmitting the channel quality information (CQI) is different between users but the transmission timing for transmitting the data arrival acknowledgement information (ACK/NACK) is the same between the users. Similar to FIG. 15, FIG. 16 shows the transmission timings when each user transmits the information indicating the downlink channel status (CQI), the data arrival acknowledgement information (ACK/NACK) and the like. For example, as shown in FIG. 16, when downlink data are transmitted to user A and the user A returns (feeds back) a negative acknowledge response (NACk) as the response to the downlink data, the data will be retransmitted to the user A. On the other hand, when another downlink data are transmitted to user C at the same timing when the retransmission data are retransmitted to the user A, the data arrival acknowledgement information (ACK/NACK) from the user A as the response to the retransmission data may be transmitted at the same timing when the data arrival acknowledgement information (ACK/NACK) is transmitted from the user C as the response to the downlink data.

Therefore, preferably, different code resources are allocated to plural mobile stations (user equipment sets) which transmit the data arrival acknowledgement information (ACK/NACK) within the same TTI. Namely, with respect to users to which the persistent scheduling is applied, the transmission timings of transmitting the data arrival acknowledgement information (ACK/NACK) in response to the downlink data channel are determined in advance, the timings can be limited. As described above, with respect to the users to which the persistent scheduling is applied, by not allocating the same code resource to the plural users who are to transmit the data arrival acknowledgement information (ACK/NACK) in response to the downlink data channel within the same TTI, it may become possible to use the same code resource for the transmissions of the data arrival acknowledgement information (ACK/NACK) and the channel quality information (CQI) with respect to each user.

As described above, the present invention is described based on the above embodiments of the present invention. However, the present invention is not limited to the above described embodiments and accompanying drawing, which are merely examples and a part of the present invention. A person skilled in the art would provide various alternative embodiments, examples, and operating techniques based on the disclosure of the present invention.

Namely, obviously, the present invention includes various embodiments that are not described in the above embodiments of the present invention. Therefore, the technical scope of the present invention should be solely determined by the matters to define the invention that are related to the claims of the present invention and that may be regarded as appropriate in the view of the above descriptions.

In the above description, the present invention is described by being divided into several embodiments. However, it should be noted that the division of the present invention into several embodiments is not an essential element of the present invention. For example, two or more embodiments may be combined on as as-needed basis. To promote an understanding of the present invention, specific values are used as examples throughout the description. However, it should be noted that such specific values are just sample values unless otherwise described, and any other values may be used.

The present invention is described above by referring to a specific embodiment. However, a person skilled in the art may understand that the above embodiment is described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other values may be used. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2007-001853 filed on Jan. 9, 2007, the entire contents of which are hereby incorporated herein by reference.

The invention claimed is:

1. A user equipment terminal transmitting at least an uplink control channel to a base station apparatus using a single carrier method, the user equipment terminal employing persistent scheduling in which a predetermined resource is periodically allocated in advance, the user equipment terminal comprising:
   a determination unit that provides data arrival acknowledgement information indicating an acknowledgement response or a negative acknowledgement response as a response to a downlink data channel;
   an estimation unit that provides channel quality information indicating downlink channel quality;
   a control channel generation unit that generates an uplink control channel including at least one of the data arrival acknowledgement information and the channel quality information; and
   a transmission unit that, when no resource for transmitting an uplink data channel is allocated, transmits the uplink control channel using a radio resource dedicated to the persistent scheduling, wherein
   the uplink control channel includes at least one unit block including a sequence in which a same complex number is multiplied to each chip of an orthogonal code sequence the user equipment terminal.

2. The user equipment terminal according to claim 1, wherein
   the radio resource dedicated to the persistent scheduling used in the transmission unit is reported using an upper layer signaling.

3. The user equipment terminal according to claim 2, wherein
   the transmission unit uses a same resource for the uplink control channel including the data arrival acknowledgement information and the uplink control channel including the channel quality information.

4. The user equipment terminal according to claim 3, wherein
   the resource used in the transmission unit is determined to be different from that used in other user equipment terminal.

5. The user equipment terminal according to claim 2, wherein
   the resource used in the transmission unit is determined to be different from that used in other user equipment terminal.

6. The user equipment terminal according to claim 1, wherein
   the transmission unit uses a same resource for the uplink control channel including the data arrival acknowledgement information and the uplink control channel including the channel quality information.

7. The user equipment terminal according to claim 6, wherein
   the resource used in the transmission unit is determined to be different from that used in other user equipment terminal.

8. The user equipment terminal according to claim 1, wherein
   the resource used in the transmission unit is determined to be different from that used in other user equipment terminal.

9. A user equipment terminal transmitting at least an uplink control channel to a base station apparatus using a single carrier method, the user equipment terminal comprising:
   a determination unit that provides data arrival acknowledgement information indicating an acknowledgement response or a negative acknowledgement response as a response to a downlink data channel;
   an estimation unit that provides channel quality information indicating downlink channel quality;
   a control channel generation unit that generates an uplink control channel including at least one of the data arrival acknowledgement information and the channel quality information; and
   a transmission unit that, when no resource for transmitting an uplink data channel is allocated, transmits the uplink control channel using a predetermined dedicated bandwidth, wherein
   the uplink control channel includes at least one unit block including a sequence in which a same complex number is multiplied to each chip of an orthogonal code sequence for the user equipment terminal, and
   the transmission unit uses a resource based on the downlink control channel when allocation information of the downlink data channel is included in a downlink control channel, and uses a resource reported using an upper-layer signaling when persistent scheduling is being applied.

10. The user equipment terminal according to claim 9, wherein
    the transmission unit uses a same resource for the uplink control channel including the data arrival acknowledgement information and the uplink control channel including the channel quality information.

11. The user equipment terminal according to claim 10, wherein
    the resource used in the transmission unit is determined to be different from that used in other user equipment terminal.

12. The user equipment terminal according to claim 9, wherein
    the resource used in the transmission unit is determined to be different from that used in other user equipment terminal.

13. A transmission method used in a user equipment terminal transmitting at least an uplink control channel to a base station apparatus using a single carrier method, the user equipment terminal employing persistent scheduling in which a predetermined resource is periodically allocated in advance, the transmission method comprising:
    a generation step of generating an uplink control channel including at least one of data arrival acknowledgement information and channel quality information, the data arrival acknowledgement information indicating an acknowledgement response or a negative acknowledgement response as a response to a downlink data channel, the channel quality information indicating downlink channel quality; and
    a transmission step of, when no resource for transmitting an uplink data channel is allocated, transmitting the uplink control channel using a radio resource dedicated to the persistent scheduling, wherein the uplink control channel includes at least one unit block including a sequence in which a same complex number is multiplied to each chip of an orthogonal code sequence for the user equipment terminal.

14. The transmission method according to claim 13, wherein
the radio resource dedicated to the persistent scheduling used in the transmission step is reported using an upper layer signaling.

15. The transmission method according to claim 14, wherein
in the transmission step, a same resource is used for the uplink control channel including the data arrival acknowledgement information and the uplink control channel including the channel quality information.

16. The transmission method according to claim 15, wherein
the resource used in the transmission step is determined to be different from that used in other user equipment terminal.

17. The transmission method according to claim 14, wherein
the resource used in the transmission step is determined to be different from that used in other user equipment terminal.

18. The transmission method according to claim 13, wherein
in the transmission step, a same resource is used for the uplink control channel including the data arrival acknowledgement information and the uplink control channel including the channel quality information.

19. The transmission method according to claim 18, wherein
the resource used in the transmission step is determined to be different from that used in other user equipment terminal.

20. The transmission method according to claim 13, wherein
the resource used in the transmission step is determined to be different from that used in other user equipment terminal.

21. A transmission method used in a user equipment terminal transmitting at least an uplink control channel to a base station apparatus using a single carrier method, the transmission method comprising:
a generation step of generating an uplink control channel including at least one of data arrival acknowledgement information and channel quality information, the data arrival acknowledgement information indicating an acknowledgement response or a negative acknowledgement response as a response to a downlink data channel, the channel quality information indicating downlink channel quality; and
a transmission step of, when no resource for transmitting an uplink data channel is allocated, transmitting the uplink control channel using a predetermined dedicated bandwidth, wherein
the uplink control channel includes at least one unit block including a sequence in which a same complex number is multiplied to each chip of an orthogonal code sequence for the user equipment terminal, and
in the transmission step, when allocation information of the downlink data channel is included in a downlink control channel, a resource based on the downlink control channel is used, and when persistent scheduling is being applied, a resource reported using an upper-layer signaling is used.

22. The transmission method according to claim 21, wherein
in the transmission step, a same resource is used for the uplink control channel including the data arrival acknowledgement information and the uplink control channel including the channel quality information.

23. The transmission method according to claim 22, wherein
the resource used in the transmission step is determined to be different from that used in other user equipment terminal.

24. The transmission method according to claim 21, wherein
the resource used in the transmission step is determined to be different from that used in other user equipment terminal.

* * * * *